United States Patent
Nimura et al.

(10) Patent No.: US 12,528,463 B2
(45) Date of Patent: Jan. 20, 2026

(54) DRIVING ASSISTANCE DEVICE

(71) Applicant: AISIN CORPORATION, Aichi (JP)

(72) Inventors: Mitsuhiro Nimura, Kariya (JP); Hidenori Nagasaka, Kariya (JP); Keita Ogawa, Kariya (JP)

(73) Assignee: AISIN CORPORATION, Aichi (JP)

( * ) Notice: Subject to any disclaimer, the term of this patent is extended or adjusted under 35 U.S.C. 154(b) by 203 days.

(21) Appl. No.: 18/281,904

(22) PCT Filed: Mar. 30, 2022

(86) PCT No.: PCT/JP2022/016002
§ 371 (c)(1),
(2) Date: Sep. 13, 2023

(87) PCT Pub. No.: WO2022/259733
PCT Pub. Date: Dec. 15, 2022

(65) Prior Publication Data
US 2024/0174227 A1  May 30, 2024

(30) Foreign Application Priority Data

Jun. 8, 2021 (JP) .............................. 2021-095778

(51) Int. Cl.
*B60W 30/14* (2006.01)
*B60W 30/18* (2012.01)

(52) U.S. Cl.
CPC .... *B60W 30/143* (2013.01); *B60W 30/18163* (2013.01); *B60W 2554/406* (2020.02); *B60W 2556/40* (2020.02)

(58) Field of Classification Search
CPC ......... B60W 30/143; B60W 30/18163; B60W 2554/406; B60W 2556/40; B60W 30/025;
(Continued)

(56) References Cited

U.S. PATENT DOCUMENTS 5,871,062 A * 2/1999 Desens .............. B60K 31/0008
                                                      180/169
7,711,485 B2 * 5/2010 Matsumoto ............ G01C 21/26
                                                       382/104
(Continued)

FOREIGN PATENT DOCUMENTS

JP   2016-017914 A   2/2016
JP   2017-102828 A   6/2017
(Continued)

OTHER PUBLICATIONS

JP-2020114689-A machine translation (Year: 2020).*
(Continued)

*Primary Examiner* — Angelina M Shudy
(74) *Attorney, Agent, or Firm* — Sughrue Mion, PLLC

(57) ABSTRACT

There is provided a driving assistance device that can provide appropriate driving assistance when a vehicle travels at a merge point where a merge into a main lane from an acceleration lane is performed. When a planned travel route on which the vehicle travels has a merge point where a merge into a main lane from an acceleration lane is performed, a location of a front portion of a first distance with a start point of the acceleration lane being a starting point is identified as a merge start point, and a location of a front portion of a second distance from the merge start point is identified as a merge completion point, using high-precision map information 16, and a travel path and a speed plan are generated/created which are recommended for the vehicle to travel along upon performing merge operation in which the vehicle accelerates from the start point of the acceleration lane to the merge start point and starts lane-to-lane movement from the acceleration lane to the main lane at the merge start point and completes the lane-to-lane movement at the merge completion point.

7 Claims, 19 Drawing Sheets

(58) Field of Classification Search
CPC ....... B60W 60/001; B60W 2554/4042; B60W 2554/80; B60W 2556/50; B60W 2720/10; B60W 2720/103; G01C 21/3658; G08G 1/09626; G08G 1/096725; G08G 1/096741; G08G 1/096775; G08G 1/096783; G08G 1/096791; G08G 1/096861; G08G 1/096872; G08G 1/143; G08G 1/163; G08G 1/166; G08G 1/167; G08G 1/096816
See application file for complete search history.

(56) References Cited

U.S. PATENT DOCUMENTS

| | | | | |
|---|---|---|---|---|
| 10,632,997 | B2* | 4/2020 | Inou | B60W 60/0011 |
| 10,773,597 | B2* | 9/2020 | Zhao | B60L 15/2045 |
| 10,902,725 | B2* | 1/2021 | Tanaka | G08G 1/163 |
| 11,209,828 | B2* | 12/2021 | Niibo | B60W 30/18163 |
| 11,225,257 | B2* | 1/2022 | Okuyama | B60W 30/18163 |
| 11,260,866 | B2* | 3/2022 | Yu | B60W 30/18163 |
| 11,292,492 | B2* | 4/2022 | Okuyama | G08G 1/167 |
| 11,414,100 | B2* | 8/2022 | Tsuji | G01C 21/3407 |
| 11,447,135 | B2* | 9/2022 | Takamatsu | G08G 1/167 |
| 11,565,713 | B2* | 1/2023 | Mimura | B60K 35/25 |
| 11,897,516 | B2* | 2/2024 | Cho | B60W 60/0027 |
| 2006/0184321 | A1* | 8/2006 | Kawakami | G01C 21/28 701/411 |
| 2006/0235597 | A1* | 10/2006 | Hori | G08G 1/096758 701/96 |
| 2009/0088925 | A1* | 4/2009 | Sugawara | B60W 30/12 340/436 |
| 2015/0210274 | A1* | 7/2015 | Clarke | G01S 19/42 382/104 |
| 2015/0353085 | A1* | 12/2015 | Lee | B60W 30/10 701/533 |
| 2016/0214612 | A1* | 7/2016 | Kashiba | B60W 60/0053 |
| 2016/0358479 | A1* | 12/2016 | Riedelsheimer | G08G 1/0145 |
| 2017/0203764 | A1* | 7/2017 | Fujiki | B60W 10/20 |
| 2018/0122244 | A1* | 5/2018 | Mueller | G08G 1/167 |
| 2018/0178796 | A1* | 6/2018 | Fukuda | B60W 30/18163 |
| 2018/0181132 | A1* | 6/2018 | Kunihiro | G05D 1/0088 |
| 2018/0237019 | A1* | 8/2018 | Goto | G01C 21/3658 |
| 2018/0281787 | A1* | 10/2018 | Shiota | B60T 7/12 |
| 2018/0354518 | A1* | 12/2018 | Inou | B60W 60/00272 |
| 2019/0047545 | A1* | 2/2019 | Gaither | G05D 1/0246 |
| 2019/0049260 | A1* | 2/2019 | Gaither | B60W 40/00 |
| 2019/0071099 | A1* | 3/2019 | Nishiguchi | B62D 15/0255 |
| 2019/0179330 | A1* | 6/2019 | Oniwa | G08G 1/16 |
| 2020/0180641 | A1 | 6/2020 | Hashimoto et al. | |
| 2020/0207354 | A1* | 7/2020 | Ishioka | B60W 10/20 |
| 2020/0207355 | A1* | 7/2020 | Ishioka | G08G 1/167 |
| 2020/0231158 | A1* | 7/2020 | Okuyama | B60W 60/0054 |
| 2020/0279488 | A1* | 9/2020 | Shibasaki | B60W 30/10 |
| 2020/0307593 | A1* | 10/2020 | Hirosawa | B60W 10/04 |
| 2021/0039650 | A1 | 2/2021 | Yu | |
| 2021/0101586 | A1* | 4/2021 | Woo | B62D 15/0285 |
| 2021/0101589 | A1* | 4/2021 | Jeon | G05D 1/0061 |
| 2021/0114617 | A1* | 4/2021 | Phillips | G01C 21/3453 |
| 2021/0163011 | A1* | 6/2021 | Maru | G08G 1/167 |
| 2021/0188275 | A1* | 6/2021 | Matsumura | B60W 60/0053 |
| 2021/0192956 | A1* | 6/2021 | Takeda | G08G 1/167 |
| 2021/0237739 | A1* | 8/2021 | Hayakawa | B60W 60/001 |
| 2021/0253107 | A1* | 8/2021 | Takamatsu | B60W 30/18163 |
| 2021/0253108 | A1* | 8/2021 | Ito | B60W 30/18163 |
| 2021/0316733 | A1* | 10/2021 | Mizoguchi | B60W 30/146 |
| 2021/0323574 | A1* | 10/2021 | Yoo | G01C 21/3407 |
| 2022/0073099 | A1* | 3/2022 | Park | B60W 30/146 |
| 2022/0163341 | A1* | 5/2022 | Maru | G01C 21/3658 |
| 2022/0185289 | A1* | 6/2022 | Arora | B62D 15/0255 |
| 2022/0309806 | A1* | 9/2022 | Zhou | G06V 20/588 |
| 2023/0037367 | A1* | 2/2023 | Qian | B60W 30/18163 |
| 2023/0091276 | A1* | 3/2023 | Rajab | B60W 30/18163 701/1 |
| 2023/0104951 | A1* | 4/2023 | Wakabayashi | B60W 40/04 701/41 |
| 2023/0267829 | A1* | 8/2023 | Dong | G08G 1/207 701/119 |
| 2023/0311869 | A1* | 10/2023 | Kato | B60Q 1/343 701/41 |
| 2023/0382387 | A1* | 11/2023 | Saito | B60W 30/12 |
| 2024/0001926 | A1* | 1/2024 | Singh | B60W 30/16 |
| 2024/0059288 | A1* | 2/2024 | Nakatsuru | B60W 30/162 |
| 2024/0149878 | A1* | 5/2024 | Omagari | B60W 60/0053 |
| 2024/0308507 | A1* | 9/2024 | Kueperkoch | B60W 30/0956 |
| 2024/0318969 | A1* | 9/2024 | Nimura | G01C 21/3461 |
| 2024/0416916 | A1* | 12/2024 | Taniguchi | G08G 1/16 |
| 2025/0058799 | A1* | 2/2025 | Inaba | G08G 1/16 |
| 2025/0115241 | A1* | 4/2025 | Wakamiya | B60W 30/16 |
| 2025/0214618 | A1* | 7/2025 | Bagnell | G05B 13/027 |
| 2025/0224253 | A1* | 7/2025 | Wimpfheimer | G01C 21/3807 |
| 2025/0282358 | A1* | 9/2025 | Lee | B60W 30/18159 |

FOREIGN PATENT DOCUMENTS

| | | | |
|---|---|---|---|
| JP | 2020-093578 A | | 6/2020 |
| JP | 2020114689 A | * | 7/2020 |
| JP | 2021-028210 A | | 2/2021 |
| JP | 2023050431 A | * | 4/2023 |
| WO | 2020/002962 A1 | | 1/2020 |

OTHER PUBLICATIONS

JP-2023050431-A machine translation (Year: 2023).*
International Search Report for PCT/JP2022/016002 dated Jun. 21, 2022 [PCT/ISA210].

* cited by examiner

DRIVING ASSISTANCE DEVICE

CROSS REFERENCE TO RELATED APPLICATIONS

This application is a National Stage of International Application No. PCT/JP2022/016002 filed Mar. 30, 2022, claiming priority based on Japanese Patent Application No. 2021-095778 filed Jun. 8, 2021, the entire contents of which are incorporated in their entirety.

TECHNICAL FIELD

The present disclosure relates to a driving assistance device that provides driving assistance for a vehicle.

BACKGROUND ART

In recent years, as vehicle's travel modes, there has been newly proposed an autonomous driving assistance system that aids a user in driving a vehicle by allowing a vehicle side to perform some or all of user's driving operations, in addition to manual travel in which the vehicle travels based on user's driving operations. In the autonomous driving assistance system, for example, a current location of the vehicle, a lane in which the vehicle travels, and the locations of other vehicles around the vehicle are detected whenever necessary, and control of the vehicle such as steering, a drive source, and a brake is autonomously performed such that the vehicle travels along a preset route.

In addition, when travel by autonomous driving assistance is performed, a travel path that is recommended for traveling is generated in advance on roads on which the vehicle travels, based on a planned travel route of the vehicle, map information, etc., and control is performed to allow the vehicle to travel along the generated travel path. In this case, in order to perform a smooth merge at a merge point where a merge into a main lane from an acceleration lane on an expressway, etc., is performed, particularly, when travel by autonomous driving assistance is performed targeting the merge point, not only the above-described travel path of the vehicle, but also travel speeds used upon traveling along the travel path is important. For example, JP 2020-93578 A discloses a technique in which, when a vehicle travels at a merge point where a merge into a main lane from an acceleration lane is performed, a prior speed is determined based on a relative speed to another vehicle traveling in the main lane, and vehicle speed is adjusted to reach the prior speed before merging, by which a merge is performed.

CITATIONS LIST

Patent Literature

Patent Literature 1: JP 2020-93578 A (pp. 5-8)

SUMMARY OF THE DISCLOSURE

Technical Problems

However, although, in the technique of the above-described Patent Literature 1, a prior speed which is a speed used when the vehicle finally merges is determined, a detailed speed plan indicating how the vehicle accelerates during traveling in an acceleration lane and at what timing the vehicle reaches the prior speed is not created beforehand. As a result, there has been a possibility of causing an event, e.g., sudden acceleration or deceleration that puts a burden on a vehicle's occupant is performed or the vehicle cannot reach the prior speed. Particularly, when travel by autonomous driving assistance is performed, there is a need to determine in advance what speed is reached at which point on a route on which the vehicle travels, but in the above-described Patent Literature 1, only a speed at a point where a merge is finally performed is determined, and thus, there is another problem that travel by autonomous driving assistance cannot be appropriately performed.

Aspects of the present disclosure are made to solve the above-described conventional problems, and provides a driving assistance device that can provide appropriate driving assistance when a vehicle travels at a merge point where a merge into a main lane from an acceleration lane is performed, by creating a detailed speed plan for performing a smooth merge at the merge point.

Solutions to Problems

To provide the above-described driving assistance device, a first driving assistance device according to the present disclosure includes planned travel route obtaining means for obtaining a planned travel route on which a vehicle travels; distance calculating means for calculating, when the planned travel route has a merge point where a merge into a main lane from an acceleration lane is performed, each of a first distance and a second distance, using map information including information about a length of an acceleration lane, a lane width of an acceleration lane, and a lane width of a main lane, the first distance being required for vehicle speed to change to a set speed for merging into a main lane by a vehicle traveling in an acceleration lane, and the second distance being required to start and complete lane-to-lane movement from an acceleration lane to a main lane after a vehicle speed of a vehicle reaches the set speed: point identifying means for identifying, as a merge start point, a location of a front portion of the first distance with a start point of the acceleration lane being a starting point, and identifying, as a merge completion point, a location of a front portion of the second distance from a merge start point: speed plan creating means for creating a speed plan for an area from a start point of the acceleration lane to a point where the merge completion point is reached: and driving assisting means for providing driving assistance for a vehicle, based on a speed plan created by the speed plan creating means.

Note that the term "driving assistance" refers to a function of performing or aiding in at least some of driver's vehicle operations instead of a driver, or to provision of display guidance or voice guidance for assisting in driving.

Note also that the "set speed" may be the same speed as a speed of the vehicle used upon moving from the acceleration lane to the main lane thereafter, or the "set speed" may be a speed lower or higher than the speed of the vehicle used upon moving from the acceleration lane to the main lane thereafter. Namely, a speed plan may be created in which the vehicle moves to the main lane from the acceleration lane while accelerating or decelerating after passing through the merge start point.

In addition, the "speed plan" may be a plan that identifies specific speeds or may be a plan that identifies acceleration and deceleration for adjusting speed.

In addition, a second driving assistance device according to the present disclosure includes planned travel route obtaining means for obtaining a planned travel route on which a vehicle travels; distance calculating means for calculating, when the planned travel route has a merge point where a merge into a main lane from an acceleration lane is performed, each of a first distance and a second distance, using map information including information about a length of an acceleration lane, a lane width of an acceleration lane, and a lane width of a main lane, the first distance being required for vehicle speed to change to a set speed for merging into a main lane by a vehicle traveling in an acceleration lane, and the second distance being required to start and complete lane-to-lane movement from an acceleration lane to a main lane after a vehicle speed of a vehicle reaches the set speed: point identifying means for identifying, as a merge start point, a location of a front portion of the first distance with a start point of the acceleration lane being a starting point, and identifying, as a merge completion point, a location of a front portion of the second distance from a merge start point: travel path generating means for generating a travel path recommended for a vehicle to travel along from a start point of the acceleration lane until reaching the merge completion point; and driving assisting means for providing driving assistance for a vehicle, based on a travel path generated by the travel path generating means.

Advantageous Effects of Various Aspects of the Disclosure

According to the first driving assistance device according to the present disclosure that has the above-described configuration, when the vehicle travels at a merge point where a merge into a main lane from an acceleration lane is performed, it becomes possible to create a detailed speed plan for performing a smooth merge at the merge point, based on road configurations around the merge point. As a result, it becomes possible to provide appropriate driving assistance, using the created speed plan.

In addition, according to the second driving assistance device according to the present disclosure, when the vehicle travels at a merge point where a merge into a main lane from an acceleration lane is performed, it becomes possible to generate a detailed travel path for performing a smooth merge at the merge point, based on road configurations around the merge point. As a result, it becomes possible to provide appropriate driving assistance, using the generated travel path.

DESCRIPTION OF EMBODIMENTS

Figure 1:
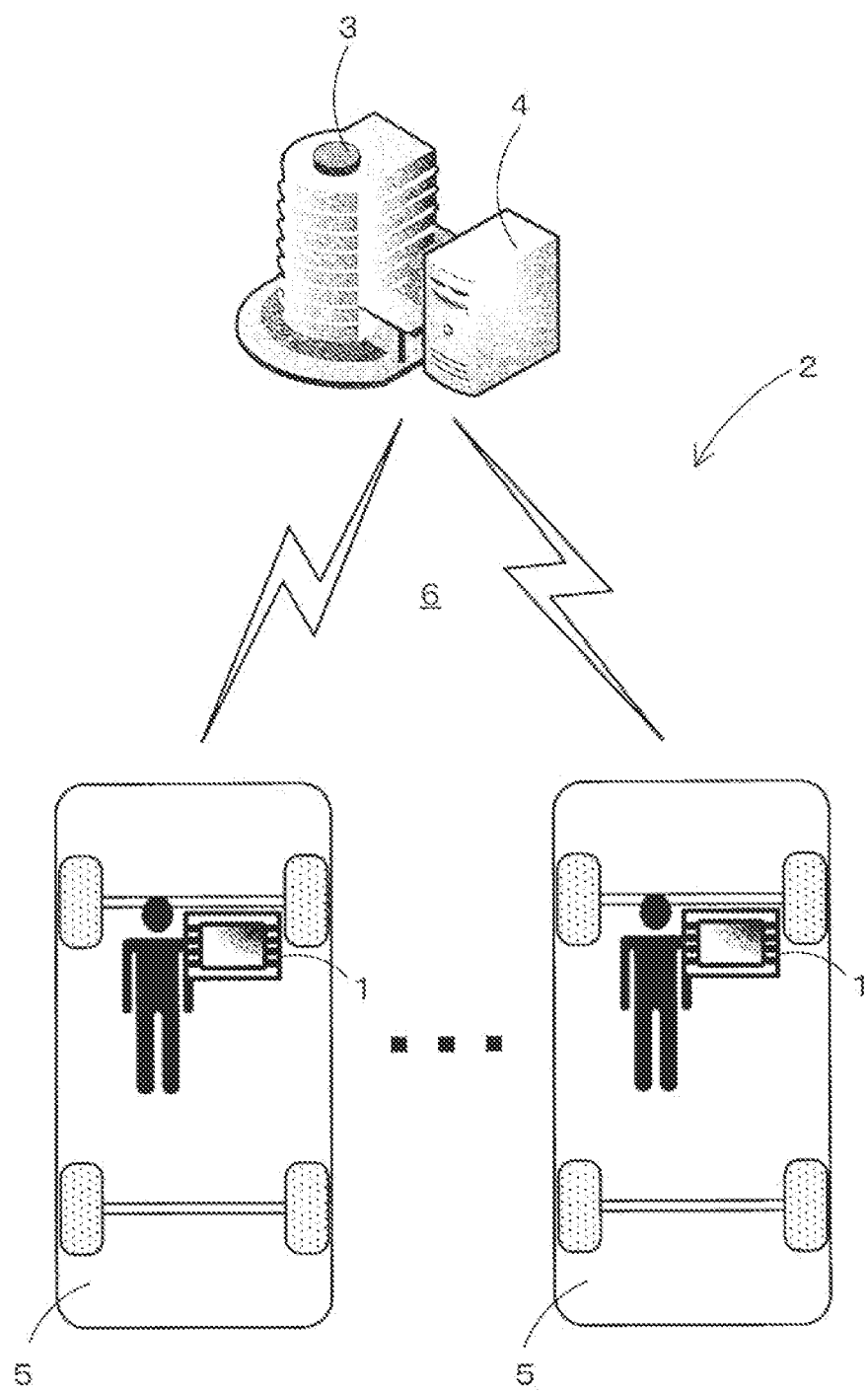
FIG. 1 is a schematic configuration diagram showing a driving assistance system according to the present embodiment.
Figure 2:
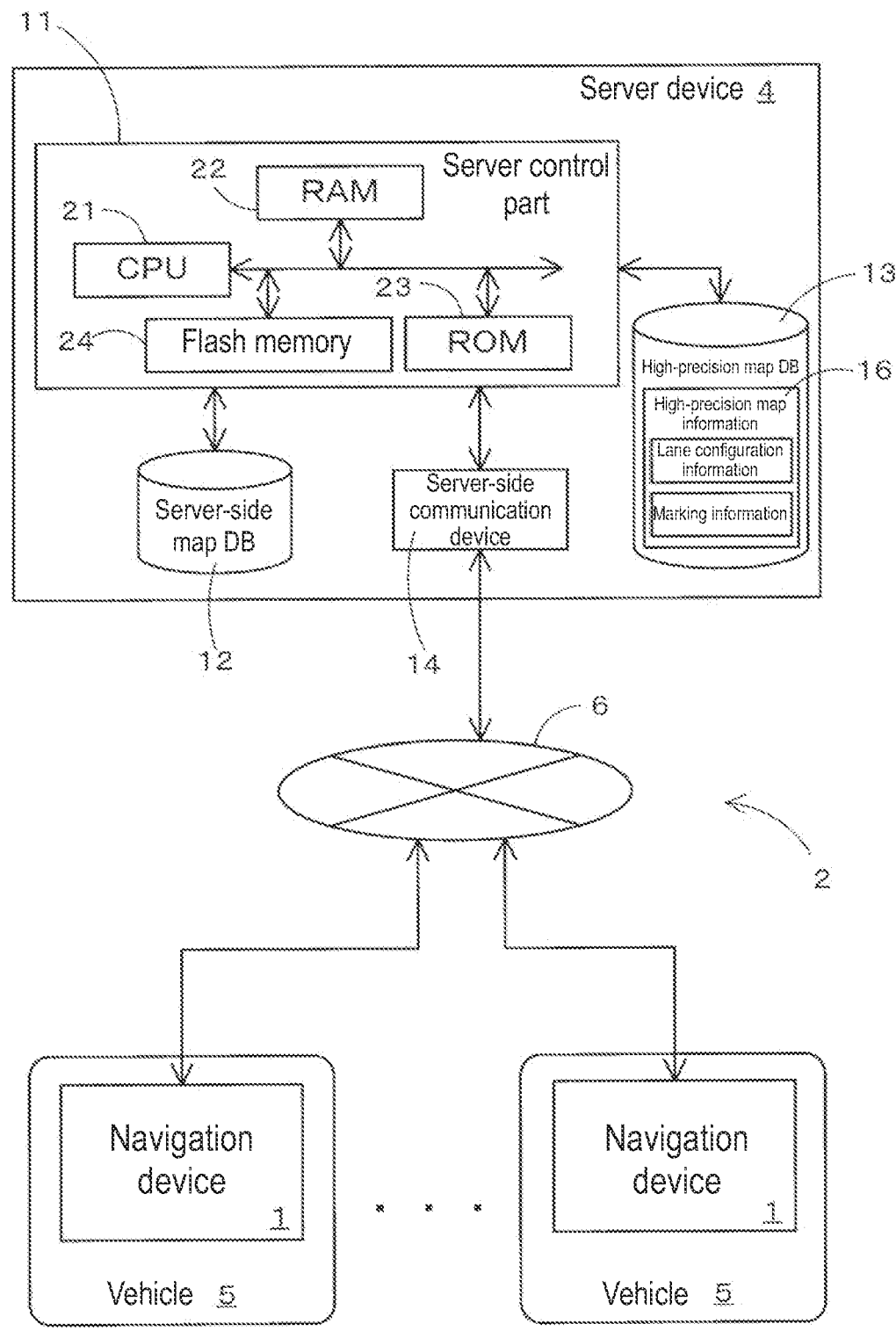
FIG. 2 is a block diagram showing a configuration of the driving assistance system according to the present embodiment.

One embodiment in which a driving assistance device is embodied into a navigation device 1 will be described in detail below with reference to the drawings. First, a schematic configuration of a driving assistance system 2 including navigation devices 1 according to the present embodiment will be described using FIGS. 1 and 2. FIG. 1 is a schematic configuration diagram showing the driving assistance system 2 according to the present embodiment. FIG. 2 is a block diagram showing a configuration of the driving assistance system 2 according to the present embodiment.

As shown in FIG. 1, the driving assistance system 2 according to the present embodiment basically includes a server device 4 provided in an information delivery center 3; and navigation devices 1 each mounted on a vehicle 5 to provide various types of assistance related to autonomous driving of the vehicle 5. In addition, the server device 4 and the navigation devices 1 are configured to be able to perform transmission and reception of electronic data with each other through a communication network 6. Note that instead of the navigation device 1, other in-vehicle devices mounted on the vehicle 5 or a vehicle control device that performs control for the vehicle 5 may be used.

Here, the vehicle 5 is a vehicle that can perform assistance travel by autonomous driving assistance in which the vehicle autonomously travels on a preset route or along a road independently of user's driving operations, in addition to manual driving travel in which the vehicle travels based on user's driving operations.

In addition, a configuration may be adopted in which autonomous driving assistance is provided for all road sections or is provided only while the vehicle travels on a specific road section (e.g., an expressway having a gate (it does not matter whether or not there is a person or whether or not a toll is collected) at a boundary). The following description is made assuming that autonomous driving sections in which autonomous driving assistance for the vehicle is provided also include parking lots in addition to all road sections including general roads and expressways, and that autonomous driving assistance is basically provided during a period from when the vehicle starts traveling until the vehicle finishes traveling (until the vehicle is parked). Note, however, that it is desirable that instead of always providing autonomous driving assistance when the vehicle travels on an autonomous driving section, autonomous driving assistance be provided only in a situation in which a user has selected provision of autonomous driving assistance (e.g., an autonomous driving start button is turned on) and it is determined that travel by autonomous driving assistance can be performed. On the other hand, the vehicle 5 may be a vehicle that can only perform assistance travel by autonomous driving assistance.

In vehicle control performed by autonomous driving assistance, for example, a current location of the vehicle, a lane in which the vehicle travels, and a location of an obstacle around the vehicle are detected whenever necessary, and as will be described later, control of the vehicle such as steering, a drive source, and a brake is autonomously performed such that the vehicle travels along a travel path generated by the navigation device 1 and at speeds in accordance with a speed plan created likewise. Note that in assistance travel by autonomous driving assistance of the present embodiment, for a lane change, a left or right turn, and a parking operation, too, travel is performed by performing the above-described vehicle control by autonomous driving assistance, but a configuration may be adopted in which special travel such as a lane change, a left or right turn, and a parking operation is performed by manual driving instead of performing travel by autonomous driving assistance.

Meanwhile, the navigation device 1 is an in-vehicle device mounted on the vehicle 5 to display a map of an area around the location of the vehicle 5 based on map data included in the navigation device 1 or map data obtained from an external source, or to accept user's input of a destination, or to display a current location of the vehicle on a map image, or to provide guidance on movement along a set guidance route. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of performing lane-to-lane movement), selection of a parking location where the vehicle is parked at a destination, and a speed plan indicating vehicle speeds used upon traveling. Note that details of the navigation device 1 will be described later.

In addition, the server device 4 performs a route search in response to a request from a navigation device 1. Specifically, information required for a route search such as a point of departure and a destination is transmitted together with a route search request from a navigation device 1 to the server device 4 (note, however, that in a case of re-searching, information about a destination does not necessarily need to be transmitted). Then, the server device 4 having received the route search request performs a route search using map information included in the server device 4, to identify a recommended route from the point of departure to the destination. Thereafter, the identified recommended route is transmitted to the navigation device 1 which is a source of the request. The navigation device 1 can provide a user with information about the received recommended route and can also generate, using the recommended route, various types of assistance information about autonomous driving assistance as will be described later.

Furthermore, the server device 4 includes high-precision map information which is map information with higher precision, separately from normal map information used for the above-described route search. The high-precision map information includes, for example, information about the lane configurations of roads (lane-by-lane road configurations, curvatures, lane widths, etc.) and markings (centerlines, lane lines, edge lines, guidelines, guide zones, etc.) painted on the roads. In addition to the information, there are also included information about intersections, information about parking lots, etc. In response to a request from a navigation device 1, the server device 4 delivers high-precision map information, and the navigation device 1 generates various types of assistance information about autonomous driving assistance as will be described later, using the high-precision map information delivered from the server device 4. Note that the high-precision map information is basically map information targeting only a road (link) and an area around the road, but may be map information that also includes an area other than the area around the road.

Note, however, that the above-described route search process does not necessarily need to be performed by the server device 4, and if a navigation device 1 has map information, then the navigation device 1 may perform the route search process. In addition, high-precision map information may be included in advance in the navigation device 1, instead of being delivered from the server device 4.

In addition, the communication network 6 includes multiple base stations disposed all over the country: and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. While the base station performs radio communication with a telecommunications company, the base station serves as an end of the communication network 6 and plays a role in relaying communication performed by navigation devices 1 present in an area (cell) where radio waves from the base station reach, to the server device 4.

Next, a configuration of the server device 4 in the driving assistance system 2 will be described in more detail using FIG. 2. The server device 4 includes, as shown in FIG. 2, a server control part 11, a server-side map DB 12 connected to the server control part 11 and serving as information recording means, a high-precision map DB 13, and a server-side communication device 14.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 includes various types of means serving as processing algorithms with an ECU of a navigation device 1 which will be described later.

Meanwhile, the server-side map DB 12 is storage means for storing server-side map information which is the latest version of map information registered based on input data from an external source and input operations. Here, the server-side map information includes a road network and various types of information required for a route search, route guidance, and map display. For example, there are included network data including nodes and links that indicate a road network, link data about roads (links), node data about node points, intersection data about each intersection, point data about points such as facilities, map display data for displaying a map, search data for searching for a route, and retrieval data for retrieving a point.

In addition, the high-precision map DB 13 is storage means for storing high-precision map information 16 which is map information with higher precision than the above-described server-side map information. The high-precision map information 16 is, particularly, map information that stores more detailed information about roads, parking lots, etc., where vehicles are to travel. In the present embodiment, the high-precision map information 16 includes, for example, for roads, information about lane configurations (lane-by-lane road configurations, curvatures, lane widths, etc.) and markings (centerlines, lane lines, edge lines, guidelines, guide zones, etc.) painted on the roads. Furthermore, the high-precision map information 16 records data representing road gradients, cants, banks, merge areas, a location where the number of lanes decreases, a location where road width becomes narrower, railroad crossings, etc., and records: for a corner, data representing the radius of curvature, an intersection, a T-junction, the entry and exit of the corner, etc.: for road attributes, data representing downhill slopes, uphill slopes, etc.: and for the types of road, data representing general roads such as national highways, prefectural highways, and narrow streets, and toll roads such as national expressways, urban expressways, automobile roads, general toll roads, and toll bridges. Furthermore, for an expressway, there is recorded, for each lane, the type of lane such as a main lane (main roadway), an acceleration lane, a deceleration lane, or a climbing lane. For the acceleration lane, the deceleration lane, and the climbing lane, there is also recorded information that identifies the start point and end point of the lane (also including the length identified by the start point and the end point). Furthermore, there is included information about the lane width of the acceleration lane and the lane width of the main lane. In addition to the number of lanes on roads, there is also stored information that identifies a passage segment in a traveling direction for each lane and a connection between roads for each lane (specifically, a correspondence between a lane included in a road before passing through an intersection and a lane included in a road after passing through the intersection). Furthermore, there is also stored speed limits set for roads. In addition, the high-precision map information is basically map information targeting only a road (link) and an area around the road, but may be map information that also includes an area other than the area around the road. In addition, although in the example shown in FIG. 2, the server-side map information stored in the server-side map DB 12 and the high-precision map information 16 are different pieces of map information, the high-precision map information 16 may be a part of the server-side map information.

Meanwhile, the server-side communication device 14 is a communication device for performing communication with the navigation device 1 of each vehicle 5 through the communication network 6. In addition, besides the navigation devices 1, it is also possible to receive traffic information including pieces of information such as traffic congestion information, regulation information, and traffic accident information which are transmitted from an Internet network or traffic information centers, e.g., a VICS (registered trademark: Vehicle Information and Communication System) center.

Figure 3:
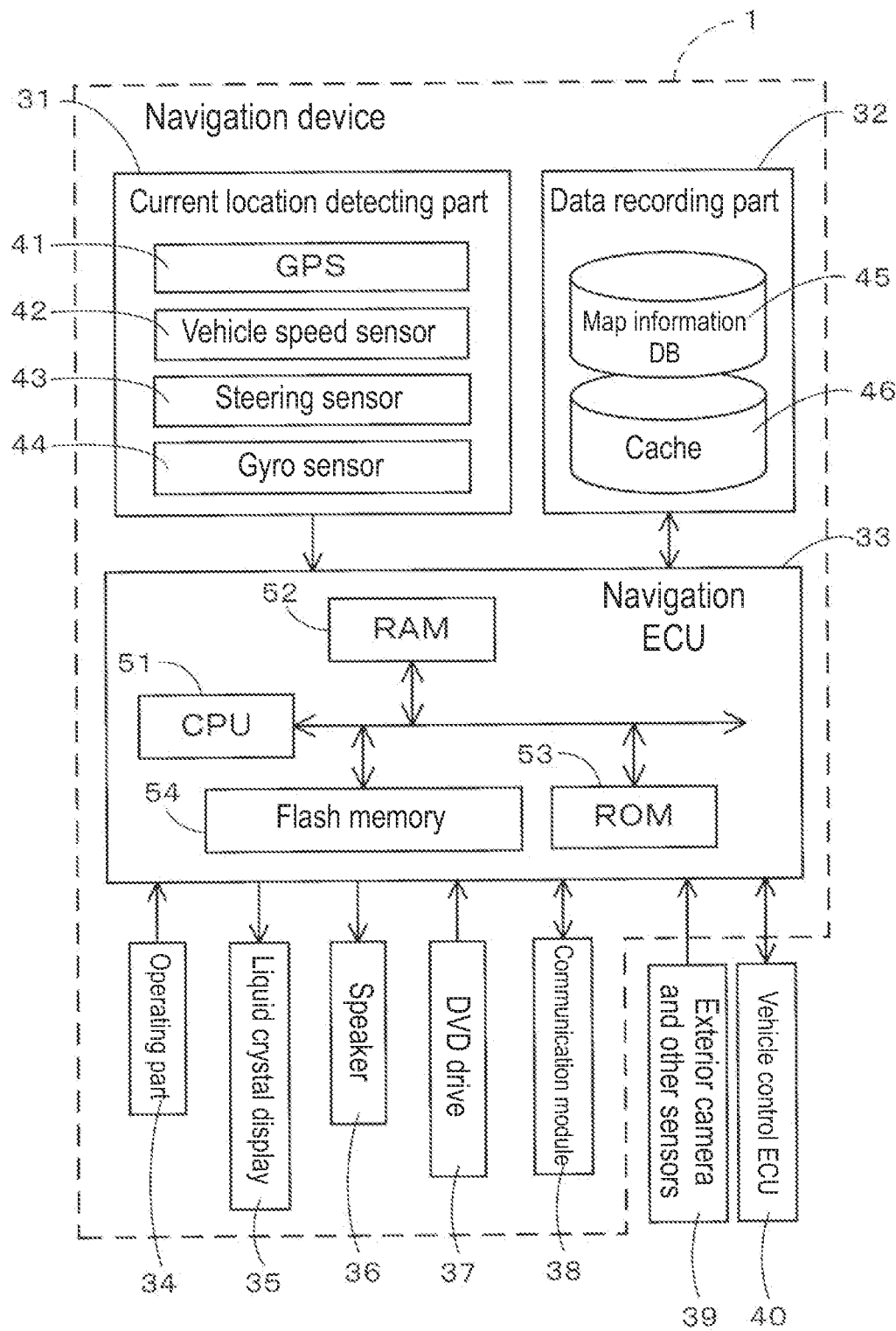
FIG. 3 is a block diagram showing a navigation device according to the present embodiment.

Next, a schematic configuration of the navigation device 1 mounted on the vehicle 5 will be described using FIG. 3. FIG. 3 is a block diagram showing the navigation device 1 according to the present embodiment.

As shown in FIG. 3, the navigation device 1 according to the present embodiment includes a current location detecting part 31 that detects a current location of the vehicle having the navigation device 1 mounted thereon; a data recording part 32 having various types of data recorded therein; a navigation ECU 33 that performs various types of arithmetic processing based on inputted information: an operating part 34 that accepts operations from a user: a liquid crystal display 35 that displays to the user a map of an area around the vehicle, information about a guidance route (a planned travel route of the vehicle) set on the navigation device 1, etc.; a speaker 36 that outputs voice guidance about route guidance; a DVD drive 37 that reads a DVD which is a storage medium: and a communication module 38 that performs communication with information centers such as a probe center and a VICS center. In addition, an exterior camera 39 and various types of sensors that are installed on the vehicle having the navigation device 1 mounted thereon are connected to the navigation device 1 through an in-vehicle network such as a CAN. Furthermore, the navigation device 1 is also connected to a vehicle control ECU 40 that performs various types of control on the vehicle having the navigation device 1 mounted thereon, such that the navigation device 1 and the vehicle control ECU 40 can perform two-way communication.

The components included in the navigation device 1 will be described in turn below.

The current location detecting part 31 includes a GPS 41, a vehicle speed sensor 42, a steering sensor 43, a gyro sensor 44, etc., and can detect the current vehicle location and orientation, a travel speed of the vehicle, a current time, etc. Here, particularly, the vehicle speed sensor 42 is a sensor for detecting the moving distance and vehicle speed of the vehicle, and generates pulses according to the rotation of drive wheels of the vehicle and outputs a pulse signal to the navigation ECU 33. Then, the navigation ECU 33 counts the generated pulses, thereby calculating the rotational speed of the drive wheels and a moving distance. Note that the navigation device 1 does not need to include all of the above-described four types of sensors, and may be configured to include only one or a plurality of types of sensors among these sensors.

In addition, the data recording part 32 includes a hard disk (not shown) serving as an external storage device and a recording medium: and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. In addition, in the present embodiment, as described above, the server device 4 searches for a route to a destination, and thus, the map information DB 45 may be omitted. Even if the map information DB 45 is omitted, it is also possible to obtain map information from the server device 4 as necessary.

Here, the map information DB 45 is storage means having stored therein, for example, link data about roads (links), node data about node points, search data used in processes related to a route search or change, facility data about facilities, map display data for displaying a map, intersection data about each intersection, and retrieval data for retrieving a point.

Meanwhile, the cache 46 is storage means for saving high-precision map information 16 having been delivered from the server device 4 in the past. A saving period can be set as appropriate, and may be, for example, a predetermined period (e.g., one month) after storage or until an ACC power supply (accessory power supply) of the vehicle is turned off. In addition, after the amount of data stored in the cache 46 reaches an upper limit, the data may be sequentially deleted in order of oldest to newest. The navigation ECU 33 generates various types of assistance information about autonomous driving assistance, using the high-precision map information 16 stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores route data obtained when a route is searched, etc., a ROM 53 having recorded therein a program for control, an autonomous driving assistance program (see FIG. 4) which will be described later, etc., and a flash memory 54 that stores a program read from the ROM 53. Note that the navigation ECU 33 includes various types of means serving as processing algorithms. For example, planned travel route obtaining means obtains a planned travel route on which the vehicle travels. Distance calculating means calculates, when the planned travel route has a merge point where a merge into a main lane from an acceleration lane is performed, each of a first distance required for vehicle speed to change to a set speed for merging into the main lane by the vehicle traveling in the acceleration lane; and a second distance required to start and complete lane-to-lane movement from the acceleration lane to the main lane after the vehicle speed of the vehicle reaches the set speed, using map information including information about the length of the acceleration lane, the lane width of the acceleration lane, and the lane width of the main lane. Point identifying means identifies, as a merge start point, the location of a front portion of the first distance with a start point of the acceleration lane being a starting point, and identifies, as a merge completion point, the location of a front portion of the second distance from the merge start point. Speed plan creating means creates a speed plan for an area from the start point of the acceleration lane to a point where the vehicle reaches the merge completion point. Travel path generating means generates a travel path recommended for the vehicle to travel along from the start point of the acceleration lane until reaching the merge completion point. Driving assisting means provides driving assistance for the vehicle, based on the generated travel path and the created speed plan.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, information on guidance along a guidance route (planned travel route), news, weather forecasts, a time, e-mails, TV programs, etc. Note that instead of the liquid crystal display 35, a HUD or an HMD may be used.

In addition, the speaker 36 outputs voice guidance that provides guidance on travel along a guidance route (planned travel route) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., which are transmitted from traffic information centers, e.g., a VICS center and a probe center, and corresponds, for example, to a mobile phone or a DCM. In addition, the communication module 38 also includes a vehicle-to-vehicle communication device that performs communication between vehicles and a vehicle-to-roadside-device communication device that performs communication with a roadside device. In addition, the communication module 38 is also used to transmit and receive route information searched by the server device 4 and high-precision map information 16 to and from the server device 4.

In addition, the exterior camera 39 includes, for example, a camera that uses a solid-state imaging device such as a CCD, and is attached to the upper side of a front bumper of the vehicle and is placed such that an optical-axis direction faces downward at a predetermined angle relative to the horizontal. When the vehicle travels on an autonomous driving section, the exterior camera 39 captures an image of an area ahead in a traveling direction of the vehicle. In addition, the navigation ECU 33 performs image processing on the captured image having been captured, thereby detecting markings painted on a road on which the vehicle travels, and obstacles (also including a traveling preceding vehicle, etc., which are not to be transmitted as probe information). For example, when an obstacle has been newly detected on a current travel path, a new travel path where the vehicle travels avoiding or following the obstacle is generated. Furthermore, when the vehicle travels in an acceleration lane, another vehicle traveling in a main lane side-by-side with the vehicle is also detected based on the captured image likewise. Upon the detection, in addition to the location of another vehicle, a travel speed of another vehicle is to be detected, and based on results of the detection, new various types of assistance information about autonomous driving assistance are generated. Note that the exterior camera 39 may be configured to be disposed on the rear or side of the vehicle other than the front. Note also that for means for detecting obstacles and another vehicle traveling in the main lane, a sensor such as millimeter-wave radar or a laser sensor, vehicle-to-vehicle communication, or vehicle-to-roadside-device communication may be used instead of the camera.

In addition, the vehicle control ECU 40 is an electronic control unit that controls the vehicle having the navigation device 1 mounted thereon. In addition, driving parts of the vehicle such as steering, a brake, and an accelerator are connected to the vehicle control ECU 40, and in the present embodiment, particularly, after the vehicle starts autonomous driving assistance, each driving part is controlled, by which autonomous driving assistance for the vehicle is provided. In addition, when an override has been performed by the user during autonomous driving assistance, the fact that the override has been performed is detected.

Here, the navigation ECU 33 transmits various types of assistance information about autonomous driving assistance generated by the navigation device 1 to the vehicle control ECU 40 through the CAN after starting traveling. Then, the vehicle control ECU 40 provides autonomous driving assistance to be provided after starting traveling, using the received various types of assistance information. The assistance information includes, for example, a travel path recommended for the vehicle to travel along and a speed plan indicating vehicle speeds used upon traveling.

Figure 4:
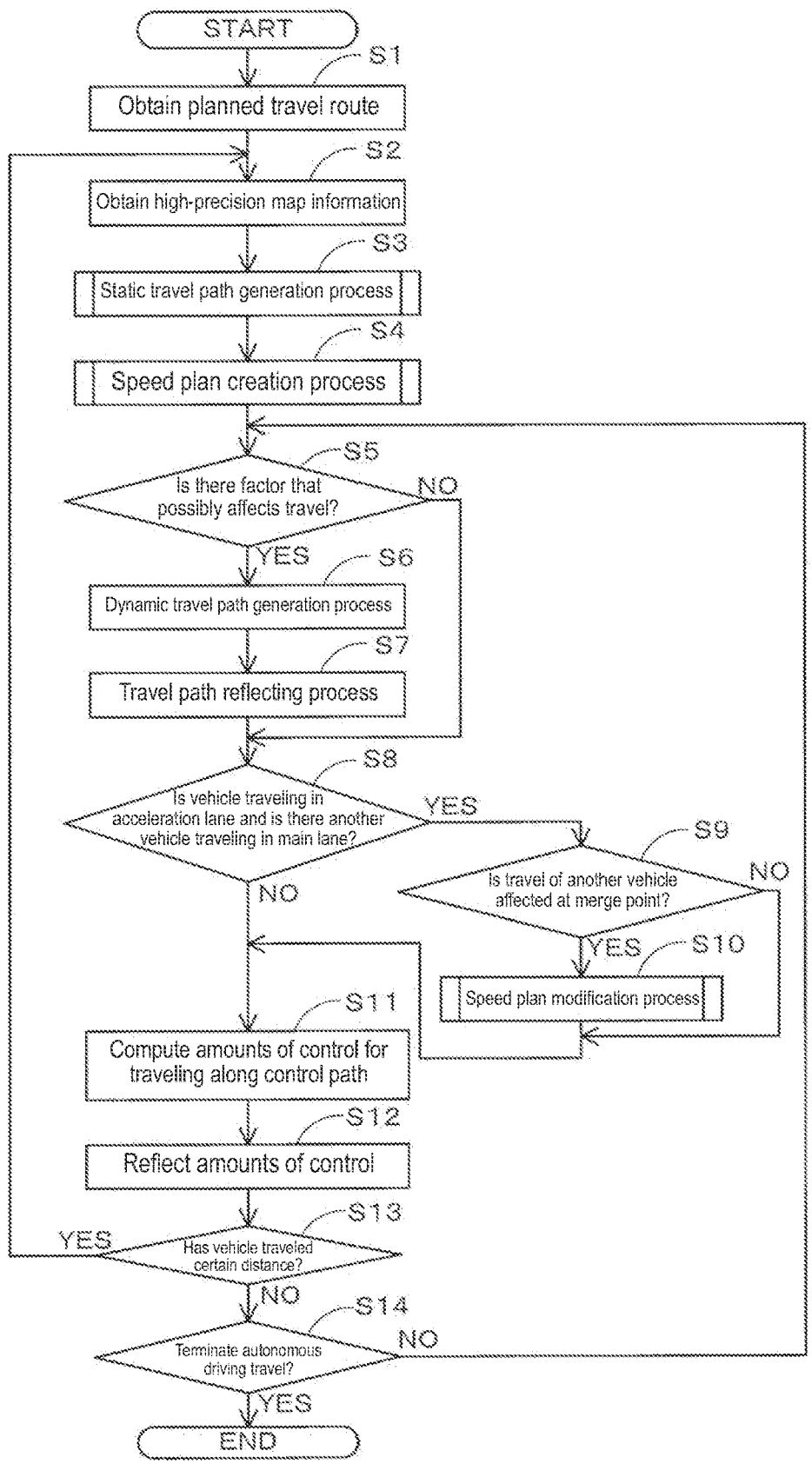
FIG. 4 is a flowchart of an autonomous driving assistance program according to the present embodiment.

Next, an autonomous driving assistance program executed by the CPU 51 of the navigation device 1 according to the present embodiment that has the above-described configuration will be described based on FIG. 4. FIG. 4 is a flowchart of the autonomous driving assistance program according to the present embodiment. Here, the autonomous driving assistance program is a program that is executed after the ACC power supply (accessory power supply) of the vehicle is turned on and when travel of the vehicle by autonomous driving assistance has started, and that performs assistance travel by autonomous driving assistance in accordance with assistance information generated by the navigation device 1. In addition, programs shown in the form of flowcharts in the following FIGS. 4, 8, 12, 15, and 17 are stored in the RAM 52 or the ROM 53 included in the navigation device 1, and are executed by the CPU 51.

First, in the autonomous driving assistance program, at step (hereinafter, abbreviated as S) 1, the CPU 51 obtains a route on which the vehicle is planned to travel in the future (hereinafter, referred to as planned travel route). Note that the planned travel route of the vehicle is, for example, a recommended route to a destination that is searched by the server device 4 by the user setting the destination. Note that when a destination is not set, a route where the vehicle travels along a road from a current location of the vehicle may be obtained as a planned travel route.

In addition, when a recommended route is searched, first, the CPU 51 transmits a route search request to the server device 4. Note that the route search request includes a terminal ID that identifies the navigation device 1 which is a sender of the route search request; and information that identifies a point of departure (e.g., a current location of the vehicle) and a destination. Note that upon re-searching, information that identifies a destination is not necessarily needed. Thereafter, the CPU 51 receives searched-route information transmitted from the server device 4 in response to the route search request. The searched-route information is information that identifies a recommended route (center route) from the point of departure to the destination (e.g., a series of links included in the recommended route) which is searched by the server device 4 based on the transmitted route search request and using the latest version of map information. The search is performed using, for example, the publicly known Dijkstra's algorithm.

Note that in the above-described recommended-route search, it is desirable to select a parking location (parking space) recommended to park the vehicle in a parking lot at the destination, and search for a recommended route to the selected parking location. Namely, it is desirable that a recommended route to be searched also include a route representing movement of the vehicle in the parking lot, in addition to a route to the parking lot. In addition, for the selection of a parking location, it is desirable to select a parking location that reduces a user's burden, taking also into account movement on foot after parking the vehicle, in addition to movement of the vehicle to the parking location.

Then, at S2, the CPU 51 obtains high-precision map information 16, targeting a section within a predetermined distance from the current location of the vehicle along the planned travel route which is obtained at the above-described S1. For example, high-precision map information 16 is obtained targeting a portion of the planned travel route included in a secondary mesh in which the vehicle is currently located. Note, however, that an area for which high-precision map information 16 is to be obtained can be changed as appropriate, and for example, high-precision map information 16 for an area within 3 km from the current location of the vehicle along the planned travel route may be obtained. In addition, high-precision map information 16 may be obtained targeting the entire planned travel route.

Figure 5:
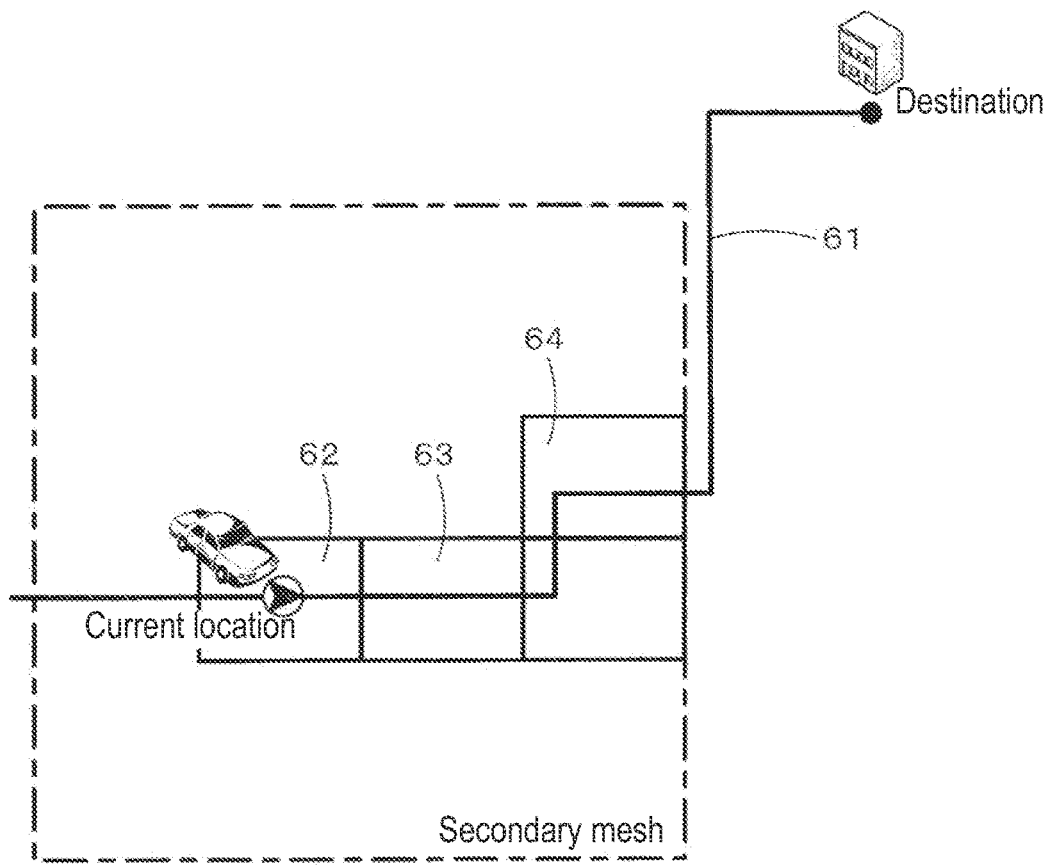
FIG. 5 is a diagram showing an area for which high-precision map information is obtained.

Here, the high-precision map information 16 is, as shown in FIG. 5, sectioned into rectangular shapes (e.g., 500 m×1 km) and stored in the high-precision map DB 13 of the server device 4. Thus, for example, when a planned travel route 61 is obtained as shown in FIG. 5, high-precision map information 16 is obtained targeting areas 62 to 64 that include a portion of the planned travel route 61 included in a secondary mesh including a current location of the vehicle. The high-precision map information 16 includes, for example, information about the lane configurations of roads, lane widths, and markings (centerlines, lane lines, edge lines, guidelines, guide zones, etc.) painted on the roads. In addition to the information, there are recorded information about intersections and information about parking lots. For an expressway, there is recorded, for each lane, information that identifies the type of lane such as a main lane (main roadway), an acceleration lane, a deceleration lane, or a climbing lane. Particularly, for the acceleration lane, the deceleration lane, and the climbing lane, there is recorded information that identifies the start point and end point of the lane (also including the length identified by the start point and the end point). In addition to the information, there is also recorded information about the lane width of the acceleration lane and the lane width of the main lane.

In addition, the high-precision map information 16 is basically obtained from the server device 4, but when there is high-precision map information 16 for areas that is already stored in the cache 46, the high-precision map information 16 is obtained from the cache 46. In addition, the high-precision map information 16 obtained from the server device 4 is temporarily stored in the cache 46.

Thereafter, at S3, the CPU 51 performs a static travel path generation process (FIG. 8) which will be described later. Here, the static travel path generation process is a process of generating a static travel path which is a travel path recommended for the vehicle to travel along on roads included in the planned travel route, based on the planned travel route of the vehicle and the high-precision map information 16 obtained at the above-described S2. Particularly, the CPU 51 identifies, as a static travel path, a travel path recommended for the vehicle to travel along in units of lanes included in the planned travel route. Note that a static travel path is generated targeting, as will be described later, a section from the current location of the vehicle to a location a predetermined distance ahead in a traveling direction (e.g., within a secondary mesh in which the vehicle is currently located or all sections present before reaching the destination). Note that the predetermined distance can be changed as appropriate, and a static travel path is generated targeting a region including at least an area outside a range (detection range) in which road conditions around the vehicle can be detected using the exterior camera 39 and other sensors.

Then, at S4, the CPU 51 performs a speed plan creation process (FIG. 15) which will be described later. Here, the speed plan creation process is a process of creating a speed plan for the vehicle which is used upon traveling along the static travel path generated at the above-described S3, based on the high-precision map information 16 obtained at the above-described S2.

Then, the speed plan created at the above-described S4 is stored in the flash memory 54, etc., as assistance information used for autonomous driving assistance. In addition, an acceleration plan indicating acceleration and deceleration of the vehicle required to implement the speed plan created at the above-described S4 may also be created as assistance information used for autonomous driving assistance.

Subsequently, at S5, the CPU 51 determines, as road conditions around the vehicle, particularly, whether a factor that affects travel of the vehicle is present around the vehicle, by performing image processing on a captured image having been captured with the exterior camera 39. Here, the "factor that affects travel of the vehicle" to be determined at the above-described S5 is a dynamic factor that changes in real time, and static factors based on road structures are excluded. The factor that affects travel of the vehicle corresponds, for example, to another vehicle that travels or is parked ahead in a traveling direction of the vehicle, a congested vehicle, a pedestrian located ahead in the traveling direction of the vehicle, or a construction zone present ahead in the traveling direction of the vehicle. On the other hand, intersections, curves, railroad crossings, merge areas, lane reduction areas, etc., are excluded. In addition, even if there is another vehicle, a pedestrian, or a construction zone, if there is no possibility of them overlapping a future travel path of the vehicle (e.g., if they are located away from the future travel path of the vehicle), then they are excluded from the "factor that affects travel of the vehicle". In addition, for means for detecting a factor that possibly affects travel of the vehicle, a sensor such as millimeter-wave radar or a laser sensor, vehicle-to-vehicle communication, or vehicle-to-roadside-device communication may be used instead of the camera.

In addition, for example, an external server may manage the real-time locations, etc., of vehicles traveling on roads across the country, and the CPU 51 may obtain the location of another vehicle located around the vehicle from the external server to perform the determination process at the above-described S5.

If it is determined that a factor that affects travel of the vehicle is present around the vehicle (S5: YES), then processing transitions to S6. On the other hand, if it is determined that a factor that affects travel of the vehicle is not present around the vehicle (S5: NO), then processing transitions to S8.

Figure 6:
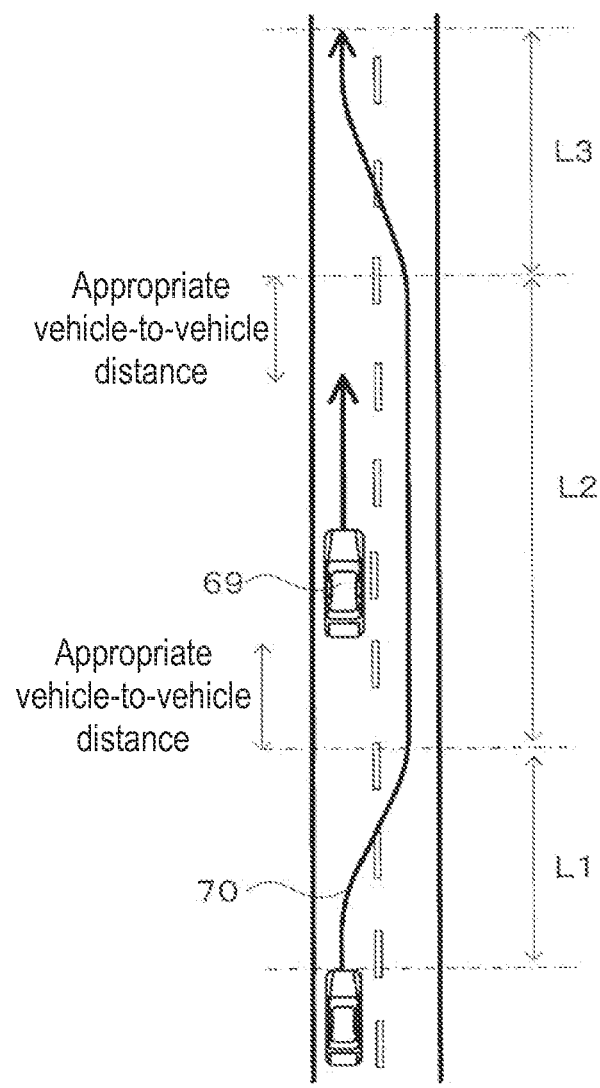
FIG. 6 is a diagram showing an example of an avoidance path which is one of dynamic travel paths.

At S6, the CPU 51 generates, as a dynamic travel path, a new path for the vehicle to travel from the current location of the vehicle, and avoid or follow the "factor that affects travel of the vehicle" detected at the above-described S5, and then return to the static travel path. Note that the dynamic travel path is generated targeting a section including the "factor that affects travel of the vehicle". Note also that the length of the section varies depending on what the factor is. For example, when the "factor that affects travel of the vehicle" is another vehicle (preceding vehicle) traveling ahead of the vehicle, an avoidance path which is a path where, as shown in FIG. 6, the vehicle makes a lane change to the right to pass a preceding vehicle 69, and then makes a lane change to the left to return to an original lane is generated as a dynamic travel path 70. Note that a following path which is a path where the vehicle travels following the preceding vehicle 69 a predetermined distance behind the preceding vehicle 69 (or travels side-by-side with the preceding vehicle 69) without passing the preceding vehicle 69 may be generated as a dynamic travel path.

A method of calculating the dynamic travel path 70 shown in FIG. 6 will be described as an example. The CPU 51 first calculates a first path L1 required for the vehicle to move to a right lane by starting a turn of the steering and for the steering position to return to a straight-ahead direction. Note that for the first path L1, a path that is as smooth as possible and has the shortest possible distance required for a lane change is calculated using a clothoid curve on conditions that lateral acceleration (lateral G) occurring upon making a lane change does not exceed an upper limit value (e.g., 0.2 G) at which autonomous driving assistance is not interfered with and a vehicle's occupant is not given discomfort, the lateral G being calculated based on the current vehicle speed of the vehicle. In addition, maintaining an appropriate vehicle-to-vehicle distance D or more between the vehicle and the preceding vehicle 69 is another condition.

Then, a second path L2 is calculated where the vehicle travels in the right lane with a speed limit being an upper limit, to pass the preceding vehicle 69 and travels until an appropriate vehicle-to-vehicle distance D or more between the vehicle and the preceding vehicle 69 is obtained. Note that the second path L2 is basically a straight path, and the length of the path is calculated based on the vehicle speed of the preceding vehicle 69 and the speed limit for the road.

Subsequently, a third path L3 is calculated that is required for the vehicle to return to the left lane by starting a turn of the steering and for the steering position to return to the straight-ahead direction. Note that for the third path L3, a path that is as smooth as possible and has the shortest possible distance required for a lane change is calculated using a clothoid curve on conditions that lateral acceleration (lateral G) occurring upon making a lane change does not exceed an upper limit value (e.g., 0.2 G) at which autonomous driving assistance is not interfered with and the vehicle's occupant is not given discomfort, the lateral G being calculated based on the current vehicle speed of the vehicle. In addition, maintaining an appropriate vehicle-to-vehicle distance D or more between the vehicle and the preceding vehicle 69 is another condition.

Note that a dynamic travel path is generated based on road conditions around the vehicle which are obtained using the exterior camera 39 and other sensors, and thus, a region for which a dynamic travel path is to be generated is within at least a range (detection range) in which road conditions around the vehicle can be detected using the exterior camera 39 and other sensors.

Subsequently, at S7, the CPU 51 reflects the dynamic travel path which is newly generated at the above-described S6 in the static travel path generated at the above-described S3. Specifically, a cost of each of a portion of the static travel path included in an area from the current location of the vehicle to the end of a section including the "factor that affects travel of the vehicle" and a portion of the dynamic travel path included in the area is calculated, and a travel path with the lowest cost is selected. Consequently, a part of the static travel path is replaced by the dynamic travel path as necessary. Note that depending on the situation, replacement by the dynamic travel path may not be performed, i.e., even if reflection of the dynamic travel path is performed, there may be no change in the static travel path generated at the above-described S3. Furthermore, when the dynamic travel path and the static travel path are identical paths, even if replacement is performed, there may be no change in the static travel path generated at the above-described S3.

In addition, for a case in which it becomes necessary to modify the speed plan for the vehicle which is created at the above-described S4 as a result of the reflection of the dynamic travel path at the above-described S7, the speed plan is also modified.

Thereafter, at S8, the CPU 51 determines whether the vehicle the vehicle is traveling in an acceleration lane on an expressway (also including an automobile road and an equivalent road thereto, in addition to a national expressway) and whether there is another vehicle or other vehicles traveling in a main lane into which the vehicle is to merge (hereinafter, referred to as main lane's another vehicle or main lane's other vehicles). Note that the type of the lane in which the vehicle travels is identified based on the current location of the vehicle detected by the current location detecting part 31 and the high-precision map information 16 obtained at the above-described S2. Note also that main lane's another vehicle is detected by performing image processing on a captured image having been captured with the exterior camera 39. Namely, a vehicle traveling in an adjacent main lane within a detectable range of the exterior camera 39 of the vehicle is to be detected. Note, however, that detection of main lane's another vehicle may use a sensor such as millimeter-wave radar or a laser sensor, vehicle-to-vehicle communication, or vehicle-to-roadside-device communication.

If it is determined that the vehicle the vehicle is traveling in an acceleration lane on an expressway and there is main lane's another vehicle (S8: YES), then processing transitions to S9. On the other hand, if it is determined that the vehicle the vehicle is not traveling in an acceleration lane on an expressway, or even if the vehicle is traveling in an acceleration lane on an expressway, if there is no main lane's another vehicle (S8: NO), then processing transitions to S11.

At S9, the CPU 51 determines whether travel of the main lane's another vehicle traveling in the main lane is affected by the vehicle merging into the main lane from the acceleration lane when the vehicle travels along the static travel path generated at the above-described S3 based on the speed plan created at the above-described S4.

Details of the determination process at the above-described S8 will be described below.

Figure 7:
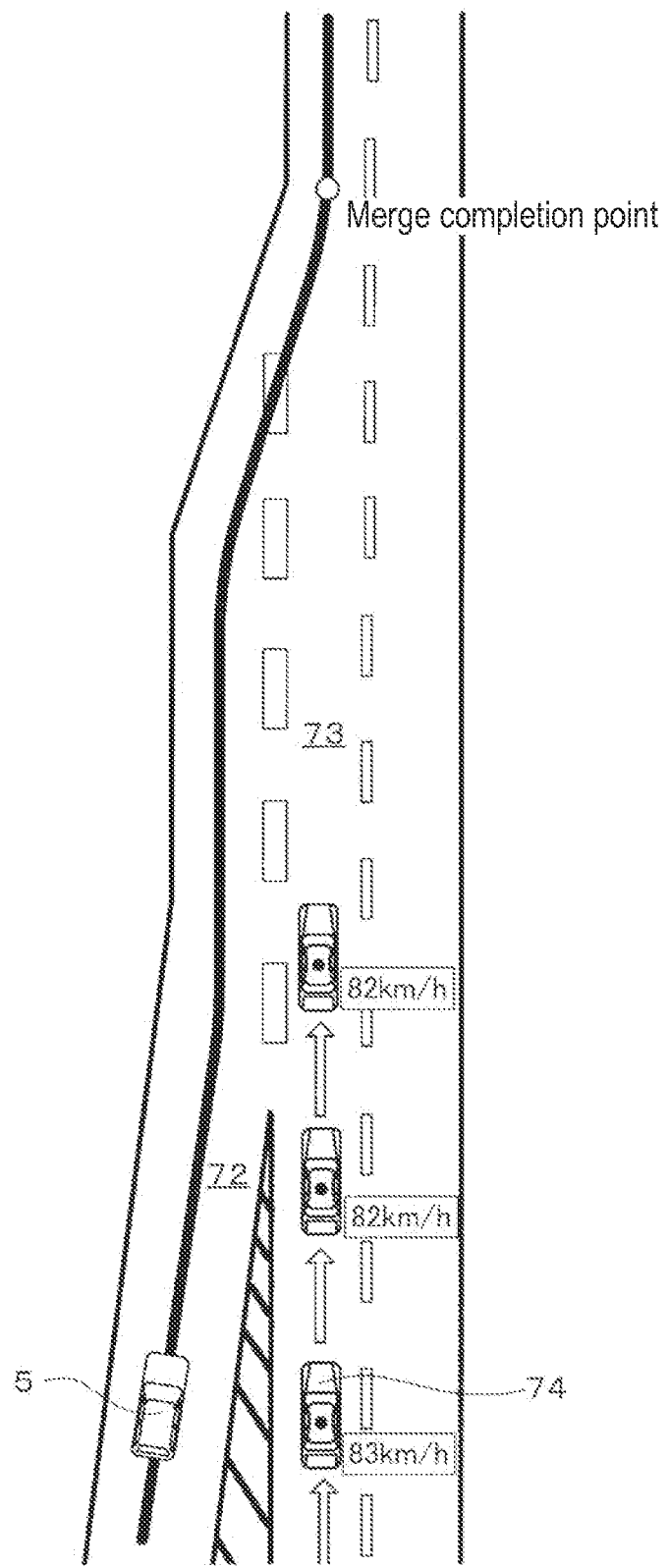
FIG. 7 is a diagram showing information on another vehicle traveling in a main lane that is detected by a vehicle.

First, the CPU 51 detects the location and travel speed of main lane's another vehicle located in the main lane (which may be a relative location and a relative speed to the vehicle), based on a captured image obtained by the exterior camera 39. Note that a sensor such as millimeter-wave radar or a laser sensor, vehicle-to-vehicle communication, or vehicle-to-roadside-device communication may be used. Then, the detected location of the main lane's another vehicle is mapped on a map and stored with a vehicle speed. For example, when, as shown in FIG. 7, main lane's another vehicle 74 traveling in a main lane 73 into which a vehicle 5 traveling in an acceleration lane 72 is to merge has been detected, each of the location and vehicle speed of the main lane's another vehicle 74 that change with the passage of time is recorded. When there are a plurality of main lane's other vehicles 74, the above-described mapping is performed for each of the plurality of main lane's other vehicles 74.

Then, predicted reaching time taken for the main lane's another vehicle 74 to reach a merge completion point (a point where the vehicle completes a merge into the main lane 73 from the acceleration lane 72 (lane-to-lane movement)) is calculated based on changes in the location and vehicle speed of the main lane's vehicle 74 stored on the map as shown in FIG. 7. Likewise, time taken for the vehicle 5 to reach the merge completion point, i.e., time taken for the vehicle to complete a merge into the main lane 73 from the acceleration lane 72 (lane-to-lane movement), is calculated based on the current travel path and speed plan for the vehicle 5. Thereafter, a time difference T between the completion of a merge into the main lane 73 by the vehicle and the reaching of the main lane's another vehicle 74 at the merge completion point is calculated.

Then, it is determined whether the calculated time difference T is less than predetermined time. If the time difference T is less than the predetermined time, then it is determined that travel of the main lane's another vehicle 74 traveling in the main lane is affected by the vehicle 5 merging into the main lane from the acceleration lane. Note that the predetermined time is, for example, two seconds but can be changed as appropriate, based on the type of road, vehicle speed, etc. Note, however, that even if the time difference T is less than the predetermined time, if the vehicle 5 reaches the merge completion point later than the reaching of the main lane's another vehicle 74 at the merge completion point (i.e., if the main lane's another vehicle 74 is a vehicle ahead of the vehicle 5 upon merging), then it may be determined that travel of the main lane's another vehicle 74 is not affected.

Note that when there are a plurality of main lane's other vehicles 74, the above-described determination is made for each of the plurality of main lane's other vehicles 74.

Then, if it is determined that travel of the main lane's another vehicle traveling in the main lane is affected by the vehicle merging into the main lane from the acceleration lane (S9: YES), then processing transitions to S10. On the other hand, if it is determined that travel of the main lane's another vehicle traveling in the main lane is not affected by the vehicle merging into the main lane from the acceleration lane (S9: NO), then processing transitions to S11.

At S10, the CPU 51 performs a speed plan modification process (FIG. 17) which will be described later. Here, the speed plan modification process is a process of modifying the speed plan for the vehicle which is created at the above-described S4, to reduce the influence on the main lane's another vehicle traveling in the main lane exerted by the vehicle merging into the main lane from the acceleration lane.

Subsequently, at S11, the CPU 51 computes the amounts of control for the vehicle to travel along the static travel path generated at the above-described S3 (when the dynamic travel path is reflected at the above-described S7, a path obtained after the reflection) at speeds in accordance with the speed plan created at the above-described S4 (when the speed plan is modified at the above-described S10, a plan obtained after the modification). Specifically, each of the amounts of control of an accelerator, a brake, a gear, and steering is computed. Note that the processes at S11 and S12 may be performed by the vehicle control ECU 40 that controls the vehicle, instead of the navigation device 1.

Thereafter, at S12, the CPU 51 reflects the amounts of control computed at S11. Specifically, the computed amounts of control are transmitted to the vehicle control ECU 40 through the CAN. The vehicle control ECU 40 performs vehicle control of each of the accelerator, the brake, the gear, and the steering, based on the received amounts of control. As a result, it becomes possible to perform travel assistance control for traveling along the static travel path generated at the above-described S3 (when the dynamic travel path is reflected at the above-described S7, a path obtained after the reflection) at speeds in accordance with the speed plan created at the above-described S4 (when the speed plan is modified at the above-described S10, a plan obtained after the modification).

Then, at S13, the CPU 51 determines whether the vehicle has traveled a certain distance since the generation of a static travel path at the above-described S3. For example, the certain distance is 1 km.

If it is determined that the vehicle has traveled a certain distance since the generation of a static travel path at the above-described S3 (S13: YES), then processing returns to S2. Thereafter, a static travel path is generated again, targeting a section within the predetermined distance from the current location of the vehicle along the planned travel route (S2 to S4). Note that, in the present embodiment, every time the vehicle has traveled a certain distance (e.g., 1 km), a static travel path is repeatedly generated targeting a section within the predetermined distance from the current location of the vehicle along the planned travel route, but when the distance to the destination is short, static travel paths to the destination may be generated all at once at the time of starting traveling.

On the other hand, if it is determined that the vehicle has not traveled a certain distance since the generation of a static travel path at the above-described S3 (S13: NO), then it is determined whether to terminate the assistance travel by autonomous driving assistance (S14). A case of terminating the assistance travel by autonomous driving assistance includes a case in which the travel by autonomous driving assistance is intentionally canceled (override) by the user operating a control panel provided on the vehicle or by the user performing a steering wheel operation, a brake operation, etc., in addition to a case in which the vehicle has reached the destination.

If it is determined to terminate the assistance travel by autonomous driving assistance (S14: YES), then the autonomous driving assistance program is terminated. On the other hand, if it is determined to continue the assistance travel by autonomous driving assistance (S14: NO), then processing returns to S5.

Figure 8:
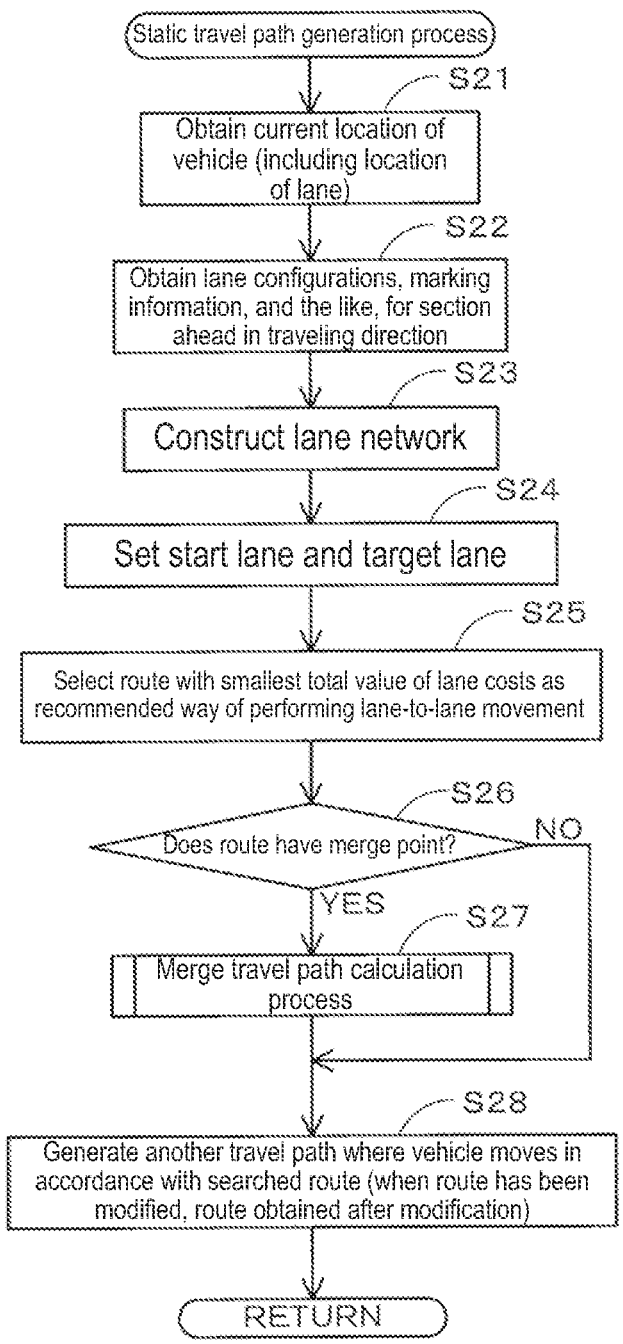
FIG. 8 is a flowchart of a subprocess program of a static travel path generation process.

Next, a subprocess of the static travel path generation process performed at the above-described S3 will be described based on FIG. 8. FIG. 8 is a flowchart of a subprocess program of the static travel path generation process.

First, at S21, the CPU 51 obtains a current location of the vehicle detected by the current location detecting part 31. Note that it is desirable to specifically identify a current location of the vehicle using, for example, high-precision GPS information or a high-precision location technique. Here, the high-precision location technique is a technique in which a white line or road surface painting information captured with a camera installed on the vehicle is detected by image recognition, and furthermore, the detected white line or road surface painting information is checked against, for example, the high-precision map information 16, by which a driving lane or a high-precision vehicle location can be detected. Furthermore, when the vehicle travels on a road having a plurality of lanes, a lane in which the vehicle travels is also identified.

Then, at S22, the CPU 51 obtains, based on the high-precision map information 16 obtained at the above-described S2, lane configurations, marking information, information about intersections, etc., targeting a section ahead in a traveling direction of the vehicle for which a static travel path is generated (e.g., within a secondary mesh including the current location of the vehicle). Note that the lane configurations and marking information obtained at the above-described S22 include information that identifies the number of lanes, lane widths, how and at which location the number of lanes increases or decreases when there is an increase or decrease in the number of lanes, a passage segment in a traveling direction for each lane, and a connection between roads for each lane (specifically, a correspondence between a lane included in a road before passing through an intersection and a lane included in a road after passing through the intersection), etc. Furthermore, for an expressway, there is recorded, for each lane, information that identifies the type of lane such as a main lane (main roadway), an acceleration lane, a deceleration lane, or a climbing lane. Particularly, for the acceleration lane, the deceleration lane, and the climbing lane, there is recorded information that identifies the start point and end point of the lane (also including the length identified by the start point and the end point). In addition to the information, there is also recorded information about the lane width of the acceleration lane and the lane width of the main lane. In addition, the information about intersections includes information about the locations and configurations of ground objects placed at the intersections, in addition to the configurations of the intersections. Furthermore, the "ground objects placed at the intersections" include road surface markings painted on road surfaces, such as guidelines (white guidelines) and rhombic guide zones (diamond-shaped markings) placed at the center of the intersections, and structures such as poles.

Subsequently, at S23, the CPU 51 constructs a lane network, targeting the section ahead in the traveling direction of the vehicle for which a static travel path is generated, based on the lane configurations and marking information obtained at the above-described S22. Here, the lane network is a network representing lane-to-lane movement that can be selected by the vehicle.

Figure 9:
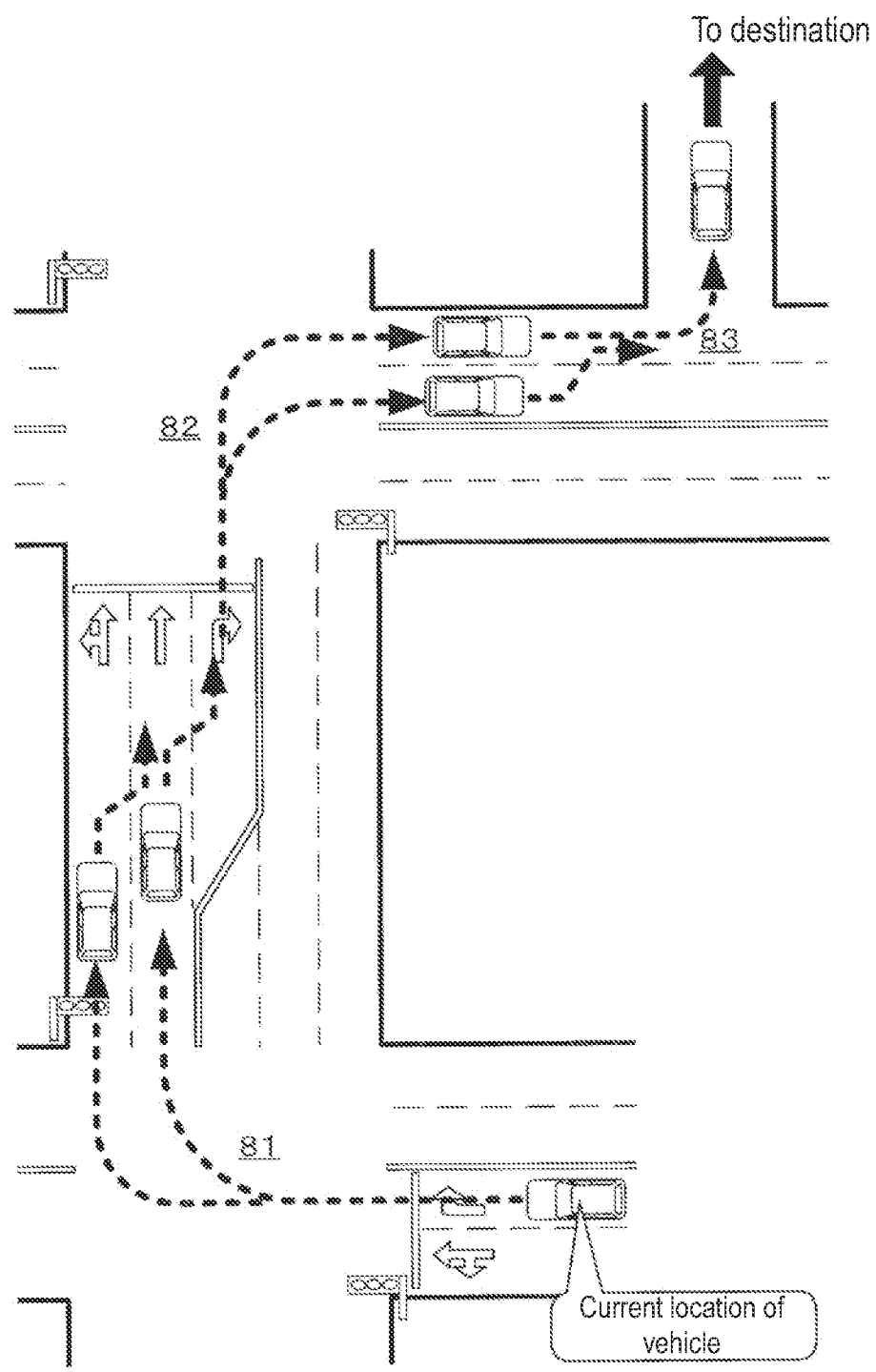
FIG. 9 is a diagram showing an example of a planned travel route of a vehicle.

Here, as an example of constructing a lane network at the above-described S23, for example, a case in which the vehicle travels on a planned travel route shown in FIG. 9 will be described as an example. The planned travel route shown in FIG. 9 is a route where the vehicle travels straight ahead from its current location, and then turns right at a next intersection 81 and further turns right at a next intersection 82, too, and turns left at a next intersection 83. In the planned travel route shown in FIG. 9, for example, when the vehicle turns right at the intersection 81, the vehicle can enter a right lane or can also enter a left lane. Note, however, that since the vehicle needs to turn right at the next intersection 82, the vehicle needs to move to a far right lane at the time of entering the intersection 82. In addition, when the vehicle turns right at the intersection 82, too, the vehicle can enter a right lane or can also enter a left lane. Note, however, that since the vehicle needs to turn left at the next intersection 83, the vehicle needs to move to a far left lane at the time of entering the intersection 83. A lane network constructed targeting a section that allows such lane-to-lane movement is shown in FIG. 10.

Figure 10:
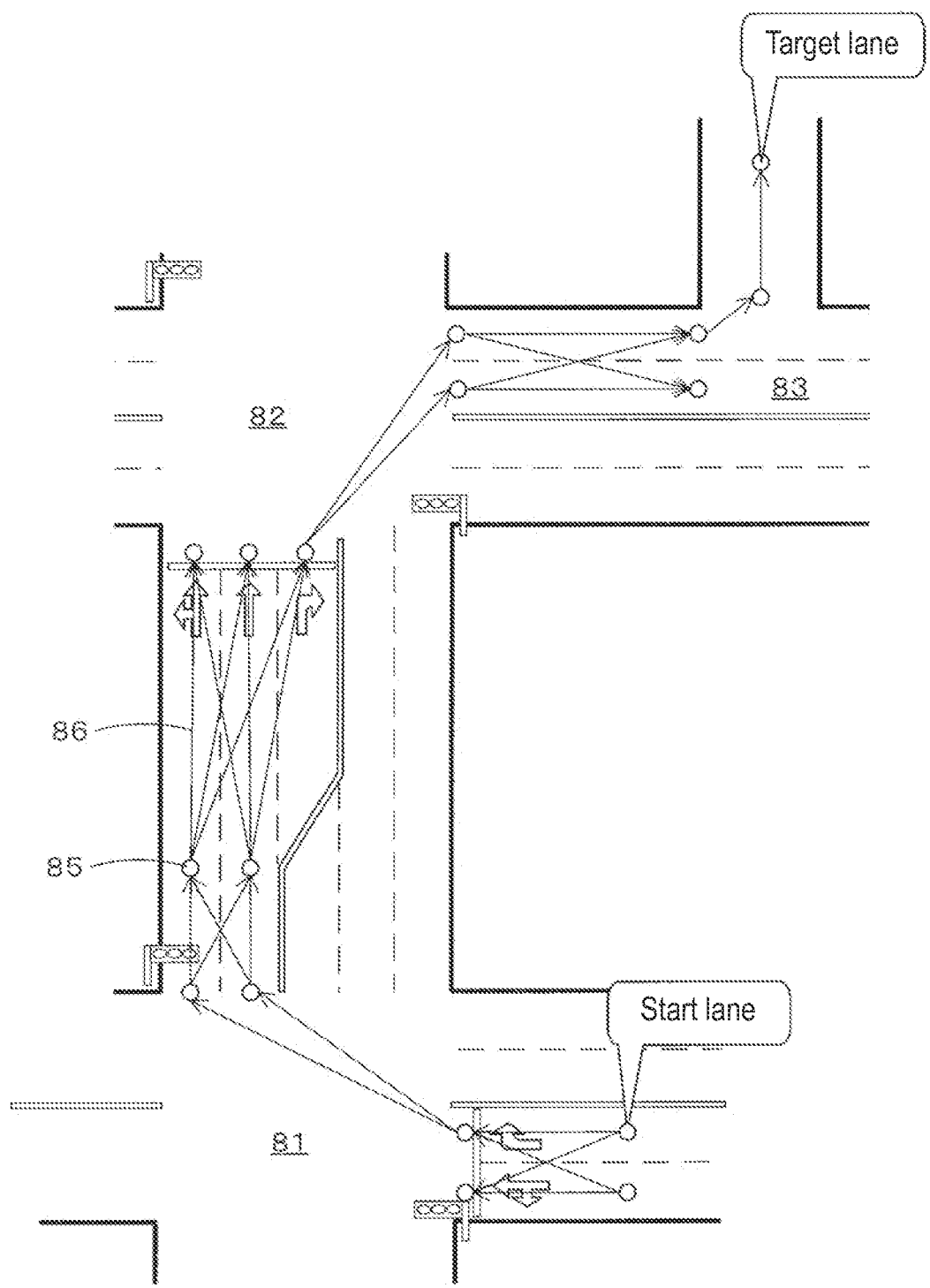
FIG. 10 is a diagram showing an example of a lane network constructed for the planned travel route shown in FIG. 9.

As shown in FIG. 10, in the lane network, a section ahead in a traveling direction of the vehicle for which a static travel path is generated is divided into a plurality of blocks (groups). Specifically, the section is divided, with a location where the vehicle enters an intersection, a location where the vehicle exits the intersection, and a location where the number of lanes increases or decreases serving as boundaries. A node point (hereinafter, referred to as lane node) 85 is set at a point in each lane located at a boundary of each divided block. Furthermore, a link (hereinafter, referred to as lane link) 86 that connects lane nodes 85 is set.

Figure 11:
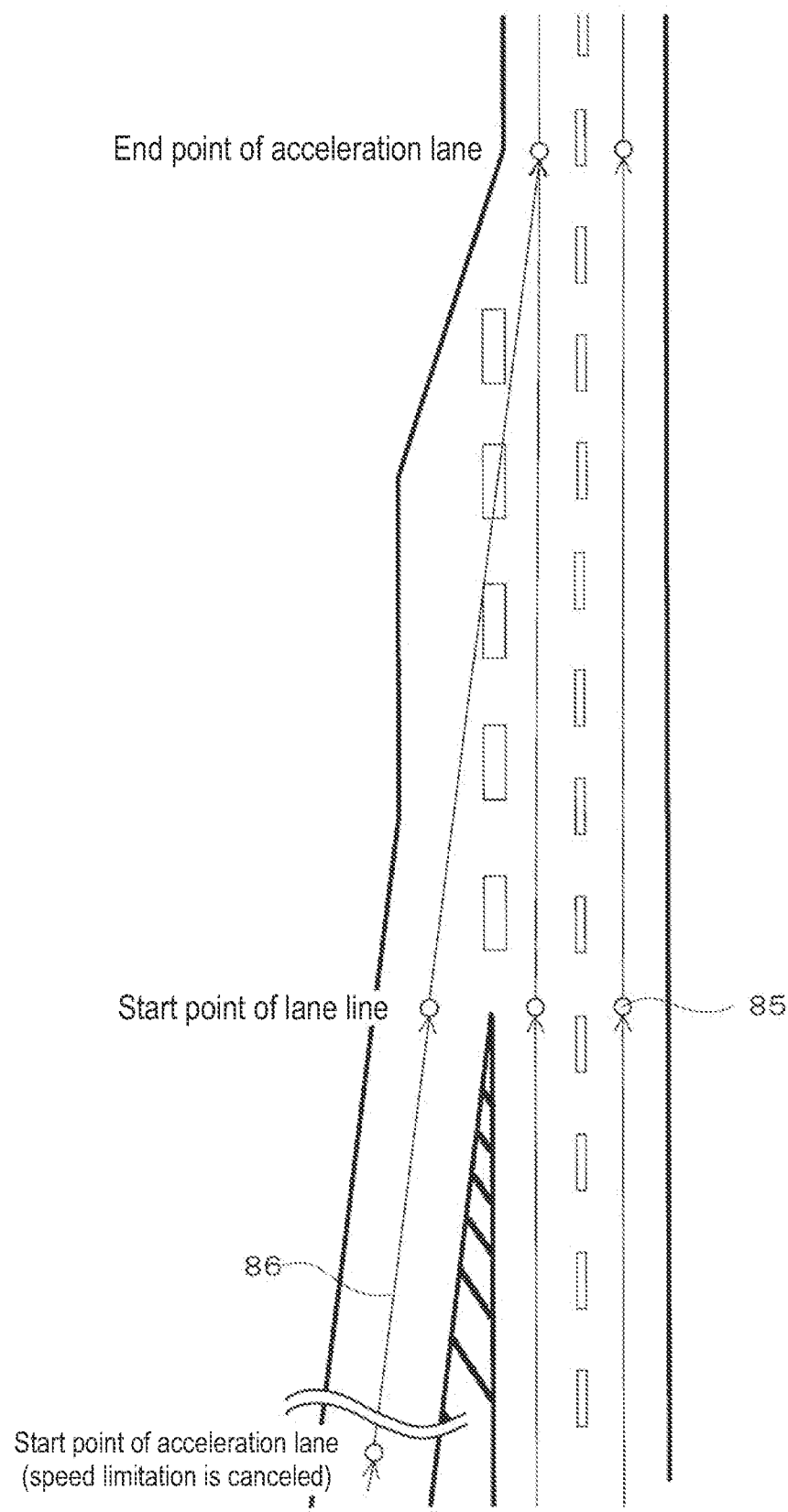
FIG. 11 is a diagram showing an example of a lane network constructed, particularly, for an area near a merge point on an expressway.

In addition, for a case in which there is a merge point where a merge into a main lane from an acceleration lane is performed, as shown in FIG. 11, division is performed such that a start point of the acceleration lane (also corresponding to a point where speed limitation is canceled) and an end point of the acceleration lane (also corresponding to an end point of a lane line between the acceleration lane and the main lane) also serve as boundaries, and lane nodes 85 are set at the start point and the end point. In addition, division is performed such that a start point of the lane line between the acceleration lane and the main lane also serves as a boundary, and a lane node 85 is set at the start point. In addition to the above-described acceleration lane, for a deceleration lane and a climbing lane, too, lane nodes 85 are set, with start points and end points serving as boundaries.

In addition, the above-described lane network includes, particularly, information that identifies, by a connection of lane nodes with a lane link at an intersection (also including a merge point and a junction point on an expressway: the same applies hereinafter), a correspondence between a lane included in a road before passing through the intersection and a lane included in a road after passing through the intersection, i.e., a lane to which the vehicle can move after passing through the intersection from a lane used before passing through the intersection. Specifically, the lane network indicates that the vehicle can move between lanes corresponding to lane nodes that are connected by a lane link among lane nodes set on a road used before passing through an intersection and lane nodes set on a road used after passing through the intersection. To generate such a lane network, the high-precision map information 16 stores, for each road connected to an intersection, lane flags indicating a correspondence between lanes and set for each combination of a road that enters the intersection and a road that exits the intersection. Upon constructing a lane network at the above-described S23, the CPU 51 forms a connection of lane nodes with a lane link at an intersection by referring to the lane flags.

Then, at S24, for the lane network constructed at the above-described S23, the CPU 51 sets a start lane (departure node), in which the vehicle starts moving, at a lane node located at a starting point of the lane network, and sets a target lane (target node), which is a target to which the vehicle moves, at a lane node located at an end point of the lane network. Note that when the starting point of the lane network is a road with a plurality of lanes in each direction, a lane node corresponding to a lane in which the vehicle is currently located serves as a start lane. On the other hand, when the end point of the lane network is a road with a plurality of lanes in each direction, a lane node corresponding to a far left lane (in a case of left-hand traffic) serves as a target lane.

Thereafter, at S25, the CPU 51 derives a route with the lowest lane costs (hereinafter, referred to as recommended route) among routes each continuously connecting the start lane to the target lane, by referring to the lane network constructed at the above-described S23. For example, a route is searched from a target-lane side using Dijkstra's algorithm. Note, however, that search means other than Dijkstra's algorithm may be used provided that a route that continuously connects the start lane to the target lane can be searched. The derived recommended route is a way of the vehicle performing lane-to-lane movement which is recommended when the vehicle moves.

In addition, a lane cost used for the above-described route search is provided for each lane link 76. The lane cost provided to each lane link 76 has, as a reference value, the length of the lane link 76 or time required to move on the lane link 76. Particularly, in the present embodiment, the length of a lane link (in units of meters) is used as the reference value of a lane cost. In addition, for a lane link involving a lane change, a lane change cost (e.g., 50) is added to the above-described reference value. Note that the value of the lane change cost may be changed depending on the number of lane changes or a location where a lane change is made. For example, when a lane change is made at a location near an intersection or when a lane change over two lanes is made, a larger value of a lane change cost to be added can be set.

Thereafter, at and after S26, the CPU 51 generates a specific travel path for traveling along the recommended route derived at the above-described S25. First, at S26, the CPU 51 determines whether the recommended route derived at the above-described S25 includes a merge point where a merge into a main lane from an acceleration lane on an expressway is performed.

If it is determined that the recommended route derived at the above-described S25 includes a merge point where a merge into a main lane from an acceleration lane on an expressway is performed (S26: YES), then processing transitions to S27. On the other hand, if it is determined that the recommended route derived at the above-described S25 does not include a merge point where a merge into a main lane from an acceleration lane on an expressway is performed (S26: NO), then processing transitions to S28.

At S27, the CPU 51 performs a merge travel path computation process (FIG. 12) which will be described later. Here, the merge travel path computation process is, particularly, a process of calculating a travel path recommended for the vehicle to travel along upon performing merge operation at the merge point where a merge into a main lane from an acceleration lane on an expressway is performed.

Thereafter, at S28, the CPU 51 generates, for an area other than the above-described merge point, a specific travel path for traveling along the recommended route derived at the above-described S25. Note that for a travel path for a section involving lane changes, the locations of the lane changes are set such that the lane changes are not continuously made as much as possible and are made at locations away from an intersection. In addition, particularly, in a case of generating a travel path for making a left or right turn at an intersection or making a lane change, lateral acceleration (lateral G) occurring in the vehicle is calculated, and paths that are connected as smoothly as possible are calculated using clothoid curves on conditions that the lateral G does not exceed an upper limit value (e.g., 0.2 G) at which autonomous driving assistance is not interfered with and a vehicle's occupant is not given discomfort. Then, by combining together the travel path and the travel path calculated at the above-described S27, a static travel path is generated which is a travel path recommended for the vehicle to travel along on roads included in the planned travel route. Note that for a block that is none of a block in which a lane change is made, a block in which merge operation is performed, and a block present within an intersection, a path where the vehicle passes through the center of a lane is obtained as a travel path recommended for the vehicle to travel along.

Then, the static travel paths generated at the above-described S27 and S28 are stored in the flash memory 54, etc., as assistance information used for autonomous driving assistance.

Figure 12:
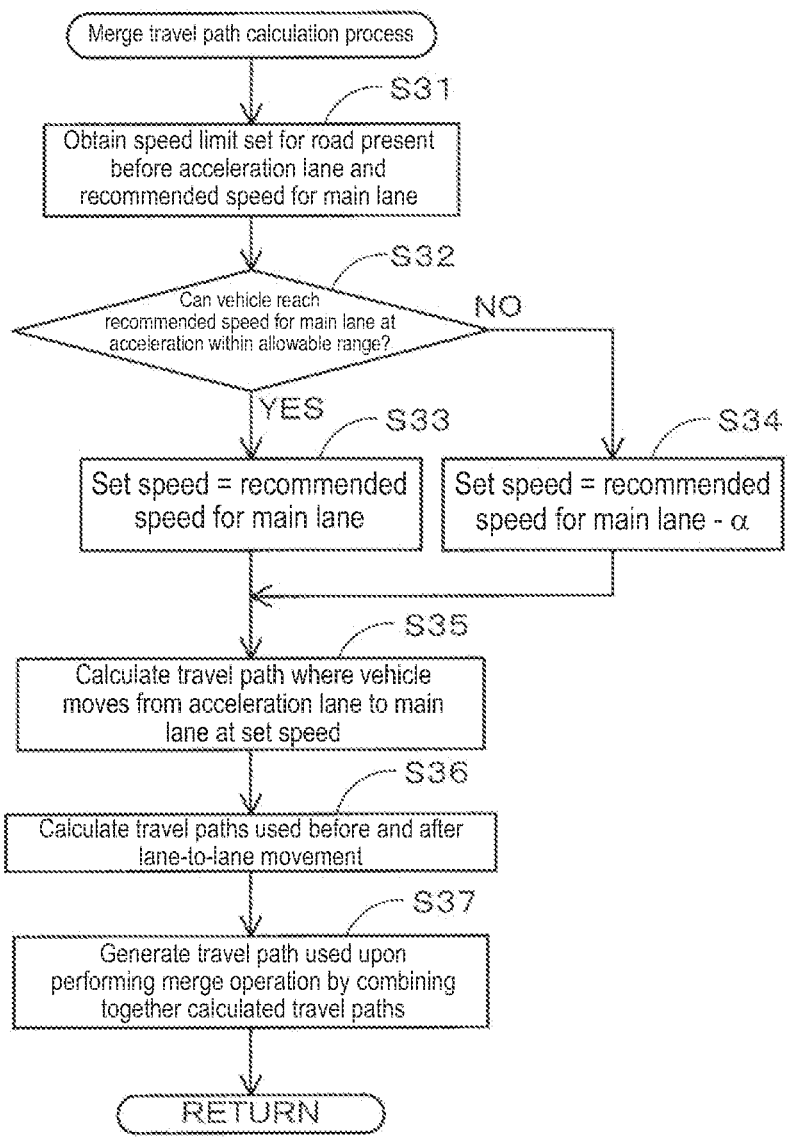
FIG. 12 is a flowchart of a subprocess program of a merge travel path calculation process.

Next, a subprocess of the merge travel path computation process performed at the above-described S27 will be described based on FIG. 12. FIG. 12 is a flowchart of a subprocess program of the merge travel path computation process.

First, at S31, the CPU 51 obtains each of a speed limit (e.g., 40 km/h) set for a road present before entering the acceleration lane which is included in the recommended route derived at the above-described S25, and a recommended speed which is a vehicle speed recommended upon traveling in the main lane into which the vehicle is to merge, based on the map information stored in the map information DB 45 or the high-precision map information 16. Note that the recommended speed at which the vehicle travels in the main lane may be a speed limit set for the main lane, or may be calculated from traffic conditions at the present time, or may be calculated from a travel history created upon actually traveling in the main lane in the past.

Then, at S32, the CPU 51 determines whether the vehicle can reach the recommended speed for the main lane at an acceleration within an allowable range, before starting merge operation from the acceleration lane to the main lane. Note that in the present embodiment, it is premised that before the vehicle enters the acceleration lane, the vehicle travels at a speed limit (e.g., 40 km/h) for a road on which the vehicle travels, and accelerates with a certain acceleration value during a period from the timing of entering the acceleration lane until merge operation (lane-to-lane movement) starts, and does not accelerate after starting the merge operation (lane-to-lane movement). Note also that an allowed acceleration value has an upper limit value at which autonomous driving assistance is not interfered with and a vehicle's occupant is not given discomfort, and is, for example, 0.2 G.

Figure 13:
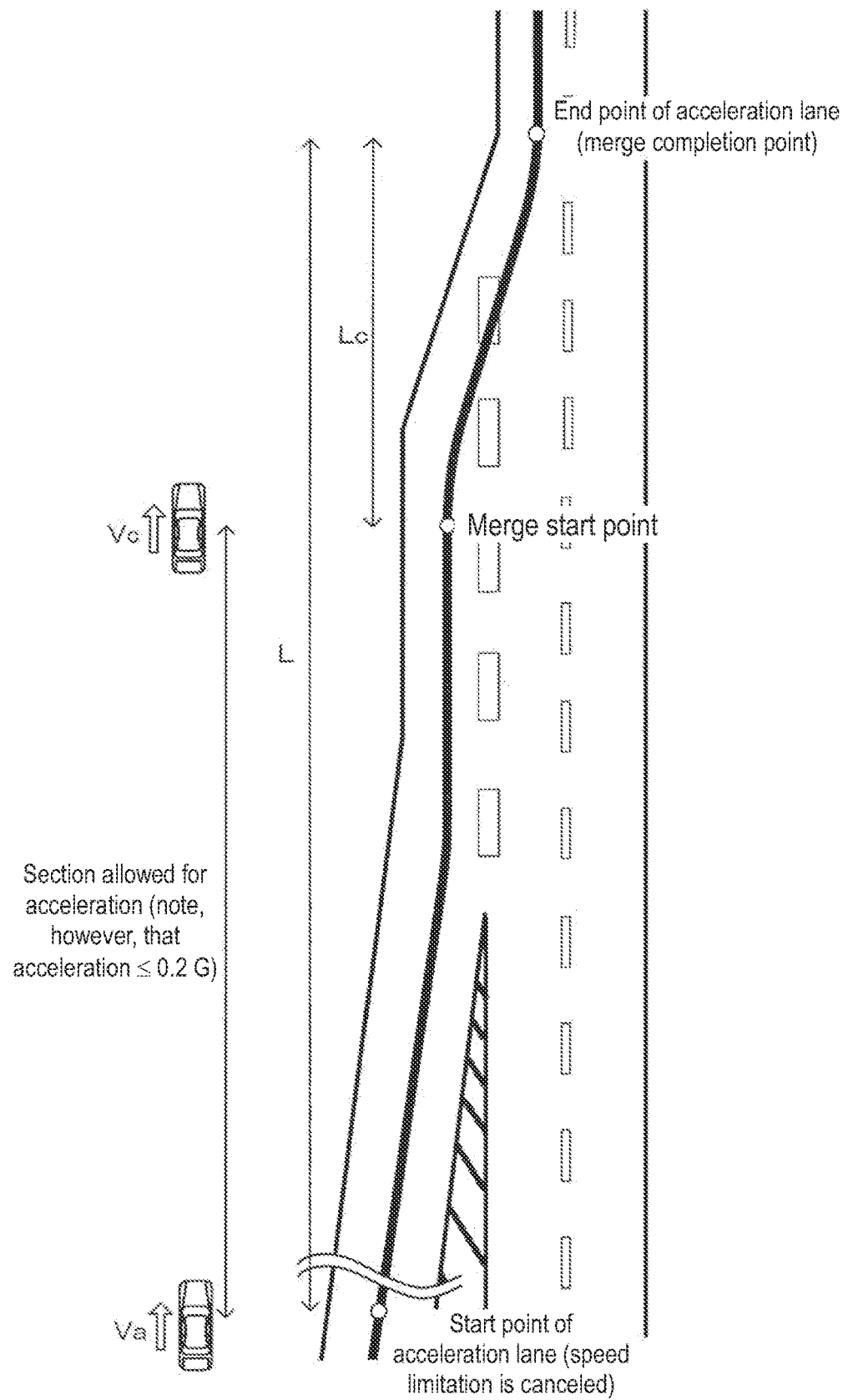
FIG. 13 is a diagram showing an example of a travel path of the vehicle near a merge point on an expressway.

For example, as shown in FIG. 13, when the speed limit before traveling in an acceleration lane is Va, the recommended speed for a main lane is Vc, the length of the acceleration lane (i.e., a distance from when the speed limit is canceled to a point where the vehicle completes a merge into the main lane (lane-to-lane movement)) is L, and the distance required for the vehicle to perform lane-to-lane movement from the acceleration lane to the main lane at the recommended speed Vc for the main lane is Lc, an acceleration value Acc required for an acceleration road is calculated using the following equation (1):

$$Acc=(Vc^2-Va^2)/(2\times(L-Lc)) \qquad (1)$$

When the acceleration value Acc calculated using the above-described equation (1) is 0.2 G or less, it is determined at the above-described S32 that the vehicle can reach the recommended speed for the main lane at an acceleration within an allowable range, before starting merge operation from the acceleration lane to the main lane.

Figure 14:
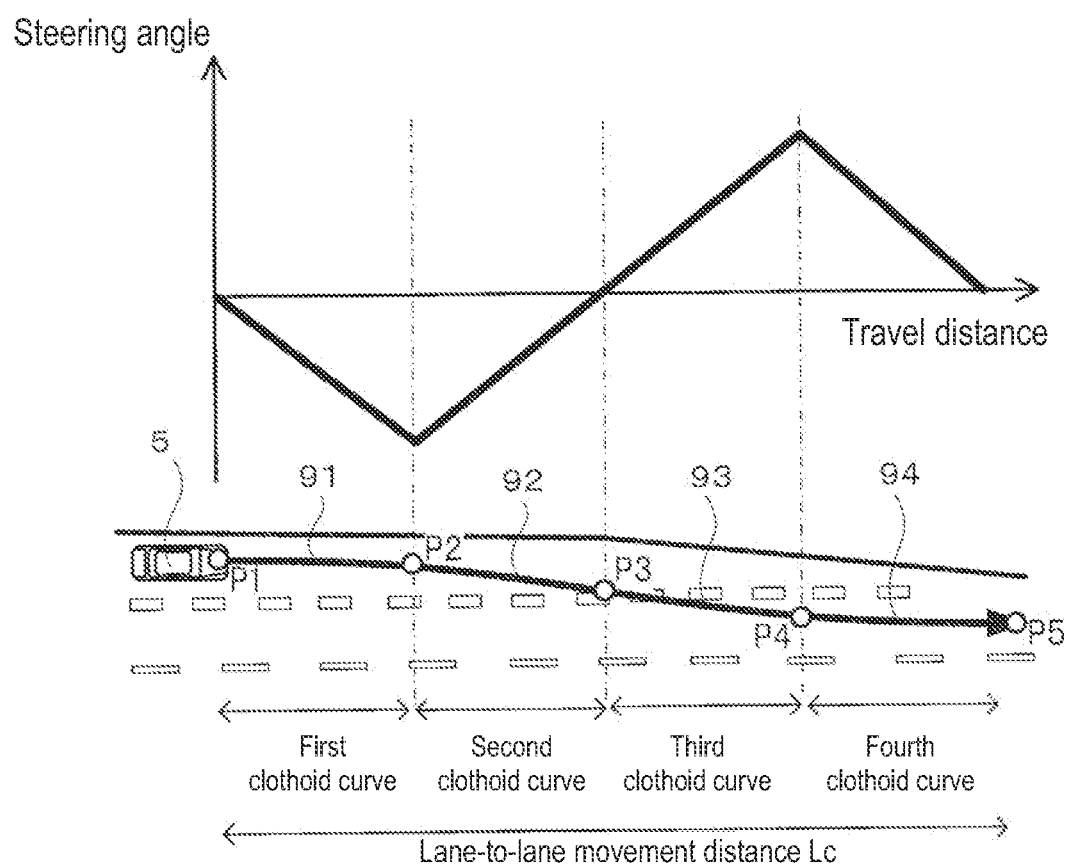
FIG. 14 is a diagram showing an example of a travel path of the vehicle used upon performing merge operation near the merge point on the expressway.

In addition, the distance Lc required for the vehicle to perform lane-to-lane movement from the acceleration lane to the main lane at the recommended speed Vc for the main lane in the above-described equation (1) is calculated as follows:

First, to calculate the distance Lc, first, a travel path of the vehicle recommended when the vehicle performs lane-to-lane movement at the recommended speed Vc is calculated. Here, the travel path of the vehicle recommended when the vehicle performs lane-to-lane movement includes clothoid curves whose curvatures continuously change. More specifically, a path is obtained in which a plurality of clothoid curves with different shapes are connected together. FIG. 14 is a diagram showing, for example, a travel path of the vehicle recommended when the vehicle moves to an adjacent lane to the right. As shown in FIG. 14, the travel path of the vehicle recommended when the vehicle moves to the adjacent lane to the right includes a first clothoid curve 91 where the vehicle travels from a start point P1 of lane-to-lane movement to a first relay point P2 while gradually turning the steering rightward (i.e., while gradually largely changing the curvature); a second clothoid curve 92 where the vehicle travels from the first relay point P2 to a lane line P3 while gradually bringing the steering back to a straight-ahead direction (i.e., while gradually mildly changing the curvature); a third clothoid curve 93 where the vehicle travels from the lane line P3 to a second relay point P4 while gradually turning the steering leftward this time (i.e., while gradually largely changing the curvature); and a fourth clothoid curve 94 where the vehicle thereafter travels from the second relay point P4 to an end point P5 of the lane-to-lane movement while gradually bringing the steering back to the straight-ahead direction (i.e., while gradually mildly changing the curvature). Note that the lateral moving width of the clothoid curves 91 to 94 is a distance between an acceleration lane and a main lane (e.g., 3.5 m). Then, the CPU 51 calculates each of the clothoid curves 91 to 94 so as to obtain a path in which acceleration (lateral G) occurring upon making a lane change does not exceed an upper limit value (e.g., 0.2 G) at which a vehicle's occupant is not given discomfort, and which is further as smooth as possible and has the shortest possible distance required for a lane change, using the clothoid curve. Then, by connecting together the calculated clothoid curves 91 to 94, a travel path of the vehicle is calculated that is recommended when the vehicle performs lane-to-lane movement at the recommended speed Vc. Furthermore, the distance Lc is also calculated from the entire length of the calculated travel path.

If it is determined at the above-described S32 that the vehicle can reach the recommended speed for the main lane at an acceleration within an allowable range, before starting merge operation from the acceleration lane to the main lane (S32: YES), then the recommended speed for the main lane is set as a set speed for merging into the main lane from the acceleration lane (S33). Note that in the present embodiment, since it is premised that vehicle speed is constant (acceleration and deceleration are not performed) until a merge is completed after the vehicle reaches the above-described set speed, the set speed also corresponds to a merge speed (a speed used during lane-to-lane movement).

On the other hand, if it is determined at the above-described S32 that the vehicle cannot reach the recommended speed for the main lane at an acceleration within an allowable range, before starting merge operation from the acceleration lane to the main lane (S32: NO), then a speed lower than the recommended speed for the main lane is set as the set speed (S34). Specifically, as the set speed, an upper limit speed is set that the vehicle can reach before starting merge operation when the vehicle accelerates at an upper limit acceleration Accmax (e.g., 0.2 G) within an allowable range after entering the acceleration road. For example, a set speed Vd is calculated using the following equation (1-2):

$$Vd=\sqrt{(Acc\,\max\times 2\times(L-Lc)+Va^2)} \qquad (1\text{-}2)$$

Subsequently, at S35, the CPU 51 calculates a travel path of the vehicle recommended when the vehicle performs lane-to-lane movement from the acceleration lane to a merge lane at the set speed identified at the above-described S33 or S34. As a result, a portion of a travel path shown in FIG. 13 from a merge start point where lane-to-lane movement starts to a merge completion point where the lane-to-lane movement is completed is calculated. Note that a specific method of calculating a travel path is already described using FIG. 14 and thus is omitted.

Thereafter, at S36, the CPU 51 calculates travel paths of the vehicle recommended before and after performing the lane-to-lane movement. In the present embodiment, as described above, the distance Lc required for the vehicle to perform lane-to-lane movement from the acceleration lane to the main lane is calculated, and then as the set speed, a speed is set that the vehicle can reach at an acceleration within an allowable range before starting merge operation from the acceleration lane to the main lane, and thus, L−Lc is a distance required for the vehicle traveling in the acceleration lane to change its vehicle speed to the set speed, and furthermore, the location of a front portion of L−Lc (first distance) with a start point of the acceleration lane being a starting point is the merge start point, and the location of a front portion of Lc (second distance) from the merge start point is the merge completion point. As shown in FIG. 13, a section from the start point of the acceleration lane to the merge start point is a section in which the vehicle accelerates without performing lane-to-lane movement, and thus, a path where the vehicle travels in the center of the acceleration lane is calculated. On the other hand, for a section after the merge completion point, a path where the vehicle travels in the center of the main lane is calculated.

Then, at S37, the CPU 51 combines together the travel path calculated at the above-described S35 and the travel paths calculated at the above-described S36, thereby generating a travel path recommended for the vehicle to travel along upon performing merge operation at the merge point where a merge into the main lane from the acceleration lane on the expressway is performed.

Figure 15:
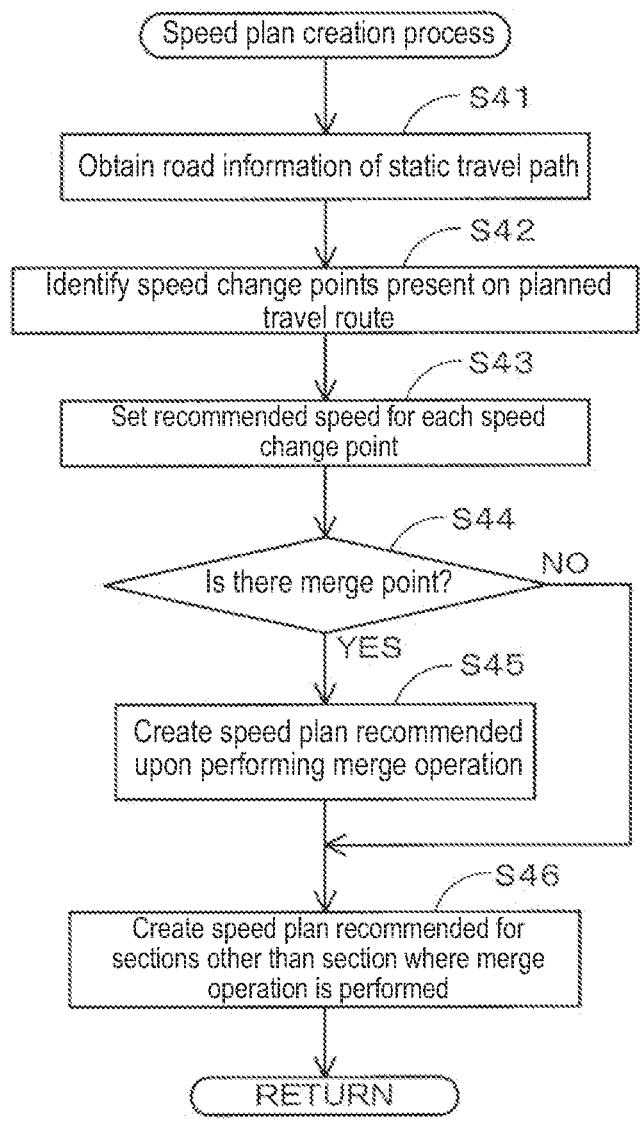
FIG. 15 is a flowchart of a subprocess program of a speed plan creation process.

Next, a subprocess of the speed plan creation process performed at the above-described S4 will be described based on FIG. 15. FIG. 15 is a flowchart of a subprocess program of the speed plan creation process.

First, at S41, the CPU 51 obtains, using map information, speed limit information for each road included in the static travel path generated at the above-described S3. Note that for a road whose speed limit information cannot be obtained, a speed limit is identified based on the type of road. For example, 30 km/h is set for narrow streets, 40 km/h is set for general roads other than trunk roads, 60 km/h is set for trunk roads such as national highways, and 100 km/h is set for expressways. Note that for an expressway, a speed limit is identified taking also into account the type of lane (an acceleration lane, a deceleration lane, or a climbing lane). In addition, the speed limit information may be obtained from the high-precision map information 16 or may be obtained from normal map information used for a route search.

Then, at S42, the CPU 51 identifies a speed change point which is a point where the speed of the vehicle changes in the static travel path generated at the above-described S3. Here, the speed change point corresponds, for example, to an intersection, a curve, a railroad crossing, or a crosswalk. When there are a plurality of speed change points in the static travel path, the plurality of speed change points are identified.

Subsequently, at S43, the CPU 51 sets, for each of the speed change points identified at the above-described S32, a recommended speed at which the vehicle passes through the speed change point. For example, for a railroad crossing or an intersection with a stop line, a mode in which first, the vehicle stops (0 km/h) and then passes through at a low speed (e.g., 10 km/h) is set as a recommended speed. In addition, for a curve or an intersection at which a left or right turn is to be made, as a recommended speed, a speed is set at which lateral acceleration (lateral G) occurring in the vehicle does not exceed an upper limit value (e.g., 0.2 G) at which autonomous driving assistance is not interfered with and a vehicle's occupant is not given discomfort. For example, calculation is performed based on the curvature of the curve, the configuration of the intersection, etc.

Then, at S44, the CPU 51 determines whether the static travel path generated at the above-described S3 includes a merge point where a merge into a main lane from an acceleration lane on an expressway is performed.

If it is determined that the static travel path generated at the above-described S3 includes a merge point where a merge into a main lane from an acceleration lane on an expressway is performed (S44: YES), then processing transitions to S45. On the other hand, if it is determined that the static travel path generated at the above-described S3 does not include a merge point where a merge into a main lane from an acceleration lane on an expressway is performed (S44: NO), then processing transitions to S46.

Figure 16:
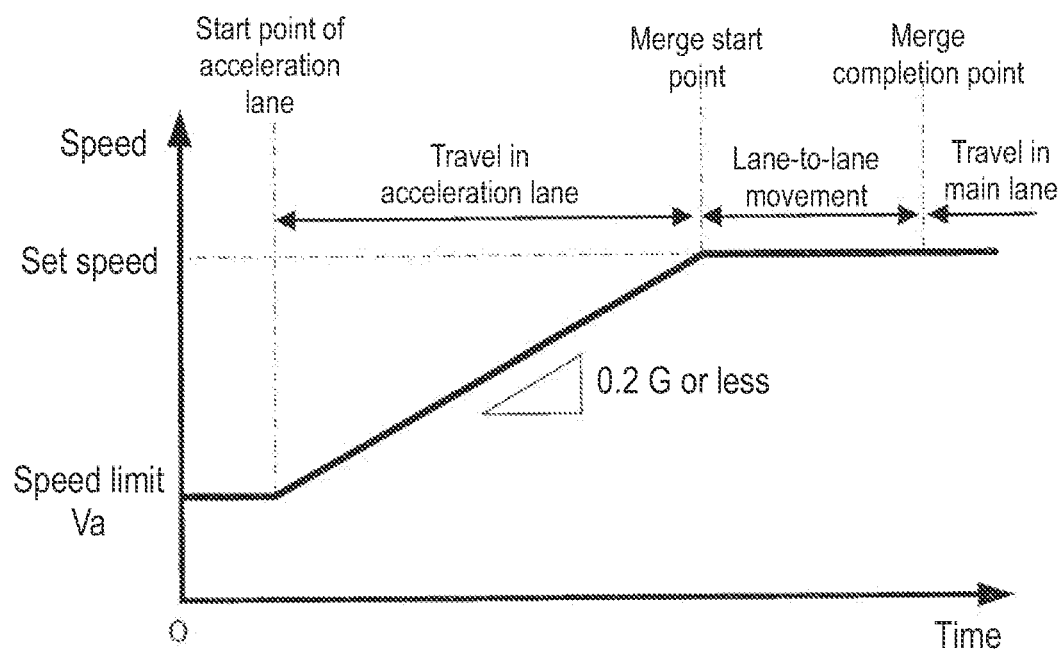
FIG. 16 is a diagram showing an example of a speed plan for the vehicle used upon traveling near the merge point on the expressway.

At S45, the CPU 51 creates a speed plan for the vehicle used upon merging into the main lane from the acceleration lane on the expressway. Specifically, as shown in FIG. 16, a speed plan is created in which the vehicle travels at a speed limit Va before reaching a start point of an acceleration lane, and after passing through the start point of the acceleration lane, the vehicle travels while increasing the speed at a certain acceleration so that the vehicle reaches a set speed (identified at the above-described S33 or S34) at the timing of reaching a merge start point, and travels at the constant set speed in an area from the merge start point to a merge completion point where merge operation is performed, and after reaching the merge completion point, the vehicle travels in the main lane at the same set speed. Note that as described above, the set speed is set to a speed that is determined to be reachable at an acceleration within an allowable range (e.g., 0.2 G or less) before reaching the merge start point (S32 to S34), and thus, an acceleration value used upon increasing the vehicle speed in a speed plan to be created is within the allowable range. Note also that when the set speed is lower than the recommended speed Vc for the main lane, a speed plan may be created in which the vehicle speed is increased to the recommended speed Vc after completing a merge.

Thereafter, at S46, the CPU 51 creates, for an area other than the above-described merge point, a speed plan used upon traveling in accordance with the static travel path generated at the above-described S3. Specifically, for roads other than the speed change points, the speed limits for roads obtained at the above-described S41 are used as recommended speeds, and the recommended speeds for the speed change points set at the above-described S43 and the recommended speeds for the roads other than the speed change points are combined together, by which data representing changes in recommended speed in a traveling direction of the vehicle along the static travel path is generated as a speed plan for the vehicle. In addition, upon creating a speed plan, the speed plan is modified as appropriate such that a speed change between speed change points satisfies a predetermined condition, more specifically, such that a condition that each of acceleration and deceleration of the vehicle traveling along the static travel path is less than or equal to a threshold value is satisfied. Then, by combining together the speed plan created at the above-described S45 and the speed plan created at the above-described S46, a speed plan for traveling along the static travel path is created.

Then, the speed plans created at the above-described S45 and S46 are stored in the flash memory 54, etc., as assistance information used for autonomous driving assistance. In addition, an acceleration plan indicating acceleration and deceleration of the vehicle required to implement the speed plans created at the above-described S45 and S46 may also be created as assistance information used for autonomous driving assistance.

Figure 17:
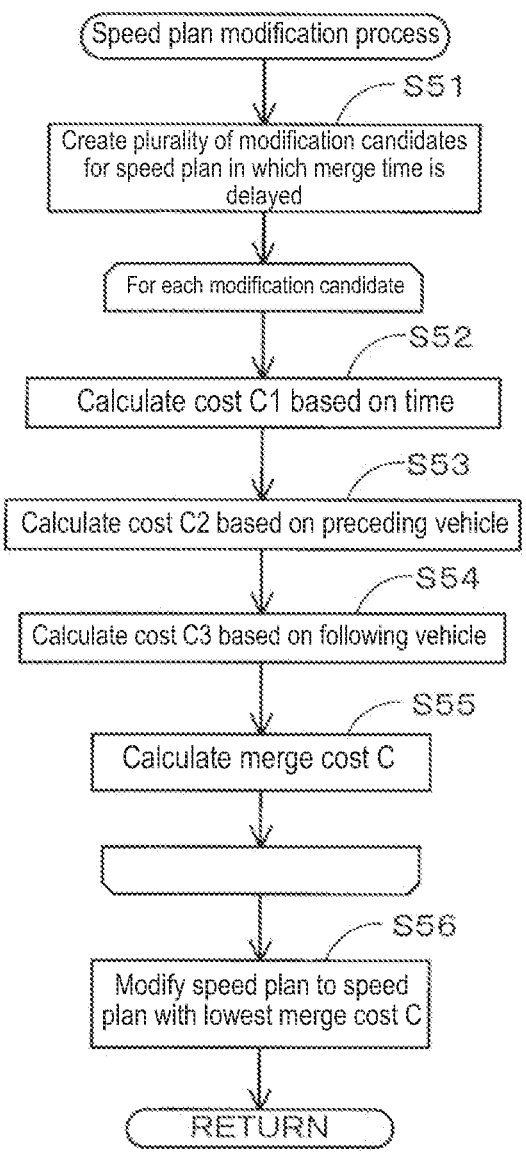
FIG. 17 is a flowchart of a subprocess program of a speed plan modification process.

Next, a subprocess of the speed plan modification process performed at the above-described S10 will be described based on FIG. 17. FIG. 17 is a flowchart of a subprocess program of the speed plan modification process.

First, at S51, the CPU 51 creates a plurality of modification candidates for the current speed plan created at the above-described S4. Note that a modification target is, particularly, the speed plan for the vehicle used upon merging into the main lane from the acceleration lane on the expressway which is created at the above-described S45.

Figure 18:
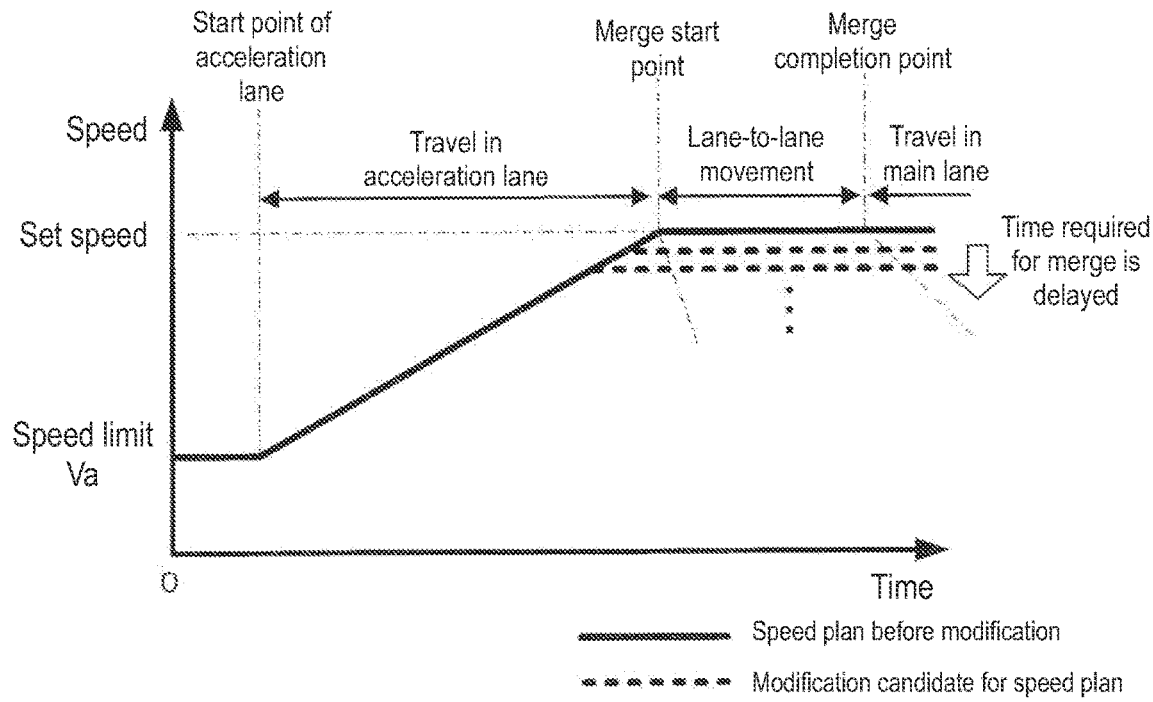
FIG. 18 is a diagram showing modification candidates for a speed plan for a case in which a main lane is not congested.

Specifically, at the above-described S51, the CPU 51 creates, as shown in FIG. 18, a plurality of speed plans in which the timing of reaching the merge completion point is delayed by predetermined time (0.1 sec) from the current speed plan. For example, a speed plan in which the timing of reaching the merge completion point is delayed by 0.1 sec from the current speed plan is a first modification candidate for the speed plan, a speed plan in which the timing of reaching the merge completion point is delayed by 0.2 sec from the current speed plan is a second modification candidate for the speed plan, and a speed plan in which the timing of reaching the merge completion point is delayed by 0.3 sec from the current speed plan is a third modification candidate for the speed plan. Note that the number of modification candidates for the speed plan to be created can be changed as appropriate, but when there are a plurality of main lane's other vehicles traveling in the main vehicle, it is desirable to create more modification candidates. As shown in FIG. 18, by reducing the set speed with an acceleration used upon traveling in the acceleration lane being maintained as in the current speed plan, it becomes possible to create a speed plan in which the timing of reaching the merge start point and the timing of reaching the merge completion point are delayed.

Figure 19:
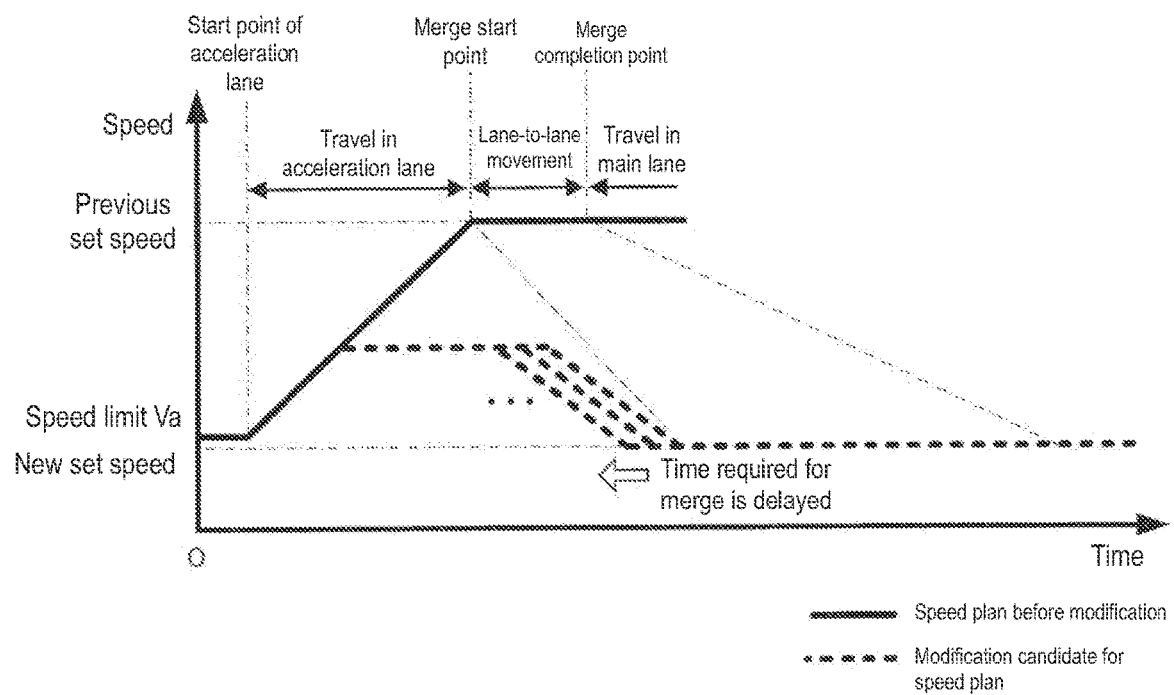
FIG. 19 is a diagram showing modification candidates for a speed plan for a case in which the main lane is congested.

On the other hand, when it is exceptionally detected that the main lane is congested, modification candidates for the speed plan are created by the following method. First, the CPU 51 obtains a travel speed of a main lane's another vehicle traveling in the main lane, as a new set speed. Note that the travel speed of the main lane's another vehicle is detected using a captured image having been captured with the exterior camera 39, but instead of the camera, a sensor such as millimeter-wave radar or a laser sensor, vehicle-to-vehicle communication, or vehicle-to-roadside-device communication may be used. Then, as shown in FIG. 19, the CPU 51 first creates, as a first modification candidate for the speed plan, a speed plan in which the vehicle stops acceleration in the acceleration lane in the middle and travels at a constant speed, and then travels while reducing the speed at a certain deceleration so that the vehicle reaches the new set speed at the timing of reaching the merge start point, and travels at the new set speed in an area from the merge start point to the merge completion point where merge operation is performed, and after reaching the merge completion point, the vehicle travels in the main lane at the same new set speed. Furthermore, as shown in FIG. 19, the CPU 51 creates a plurality of speed plans in which the timing of reaching the merge completion point is delayed by predetermined time (0.1 sec) from the first modification candidate for the speed plan by advancing the timing of starting deceleration without changing a deceleration used upon deceleration. For example, a speed plan in which the timing of reaching the merge completion point is delayed by 0.1 sec from the first modification candidate for the speed plan is a second modification candidate for the speed plan, and a speed plan in which the timing of reaching the merge completion point is delayed by 0.2 sec from the first modification candidate for the speed plan is a third modification candidate for the speed plan. Note that the number of modification candidates for the speed plan to be created can be changed as appropriate, but when there are a plurality of main lane's other vehicles traveling in the main vehicle, it is desirable to create more modification candidates.

Subsequent processes at S52 to S55 are performed for each of the modification candidates for the speed plan created at the above-described S51, and after performing the processes targeting all modification candidates for the speed plan, processing transitions to S56.

First, at S52, the CPU 51 calculates, for a modification candidate for the speed plan which is a processing target, a first cost C1 based on time required for the vehicle to complete a merge into the main lane from the acceleration lane (specifically, time required for the vehicle to reach the merge completion point after starting traveling in the acceleration lane; hereinafter, referred to as time required for a merge). The first cost C1 indicates a burden on the occupant based on the length of time required for a merge. Specifically, with reference to time required for a merge in the current speed plan created at the above-described S4, a difference (sec) between the time required for a merge and the time required for a merge in the modification candidate for the speed plan which is the processing target is calculated as the first cost C1. Note that as described using FIGS. 18 and 19, a modification candidate for the speed plan created at the above-described S51 has longer time required for a merge than the current speed plan created at the above-described S4, and thus, as the first cost increases, the time required for a merge increases by modifying the speed plan, indicating an increase in a burden on the occupant. For example, when the time required for a merge in the modification candidate for the speed plan which is the processing target is longer by 1 sec than the current speed plan created at the above-described S4, the first cost C1 is "1".

Then, at S53, the CPU 51 calculates, for the modification candidate for the speed plan which is the processing target, a second cost C2 based on a distance to a preceding vehicle present upon merging into the main lane (hereinafter, referred to as vehicle-to-preceding-vehicle distance). Note that the second cost C2 indicates a burden on the occupant based on risk occurring between the vehicle and the preceding vehicle after a merge. Specifically, based on the changes in the location and vehicle speed of main lane's another vehicle stored on the map at the above-described S8 (see FIG. 7) and the static travel path generated at the above-described S3 (when the dynamic travel path is reflected at the above-described S7, a path obtained after the reflection), a distance to a preceding vehicle at timing at which the vehicle reaches the merge completion point when the vehicle travels in accordance with the modification candidate for the speed plan which is the processing target is calculated as a vehicle-to-preceding-vehicle distance D1.

The reciprocal of the vehicle-to-preceding-vehicle distance D1 or a value obtained by subtracting the vehicle-topreceding-vehicle distance D1 from a constant may be used as the second cost C2, but in the present embodiment, the second cost C2 is calculated taking also into account other elements such as the vehicle speeds of the vehicle and the preceding vehicle, in addition to the vehicle-to-preceding-vehicle distance D1. Such calculation is performed because even if the vehicle-to-preceding-vehicle distance D1 is short, if the vehicle speed of the vehicle is low, then the risk between the vehicle and the preceding vehicle is predicted to be low, and even if the vehicle-to-preceding-vehicle distance D1 is long, if the vehicle speed of the vehicle is high, then the risk between the vehicle and the preceding vehicle is predicted to be high. In the present embodiment, the magnitude of deceleration occurring in the vehicle when it is assumed that the preceding vehicle has performed hard braking after a merge is estimated from the vehicle-to-preceding-vehicle distance D1 and is determined to be the second cost C2.

Thus, at the above-described S53, the CPU 51 first calculates a braking distance of the preceding vehicle, assuming that hard braking has occurred in the preceding vehicle. Note that it is assumed that deceleration upon hard braking is Dect (e.g., 0.6 G), and a braking distance Lt is calculated using the following equation (2). Note that the vehicle speed of the preceding vehicle is Vt.

$$Lt = Vt^2/(2 \times Dect) \qquad (2)$$

Furthermore, deceleration Dec of the vehicle, assuming that hard braking has occurred in the preceding vehicle is calculated using the following equation (3). Note that the set speed of the vehicle is Vc, a minimum vehicle-to-vehicle distance secured between the vehicle and the preceding vehicle at the time of stop is Dtop (e.g., 0.5 m), and time required for the vehicle to start deceleration after detecting hard braking of the preceding vehicle (note that, in the present embodiment, travel by autonomous driving is premised, and thus, detection of hard braking of the preceding vehicle and deceleration of the vehicle associated therewith are also autonomously performed) is Tn.

$$Dec = Vc^2/(2 \times (Lt + D1 - Dtop - Tn \times Vc)) \qquad (3)$$

The deceleration Dec calculated using the above-described equation (3) is calculated as the second cost C2. Note, however, that as an exception, for a case in which Dec is larger than Dect, the second cost C2 is infinity, i.e., the modification candidate for the speed plan which is the processing target is not adopted. In addition, for a case in which the vehicle-to-preceding-vehicle distance D1 is less than a predetermined distance (e.g., less than 1 m), too, the second cost C2 is infinity, i.e., the modification candidate for the speed plan which is the processing target is not adopted. Note that if there is no big difference in other conditions, then basically, the second cost C2 increases as the vehicle-to-preceding-vehicle distance D1 decreases, and risk occurring between the vehicle and the preceding vehicle after a merge is high, indicating an increase in a burden on the occupant.

Then, at S54, the CPU 51 calculates, for the modification candidate for the speed plan which is the processing target, a third cost C3 based on a distance to a following vehicle present upon merging into the main lane (hereinafter, referred to as vehicle-to-following-vehicle distance) and an influence exerted on travel of the following vehicle thereafter. Note that the third cost C3 indicates risk occurring between the vehicle and the following vehicle after a merge and the magnitude of influence exerted on the following vehicle. Specifically, calculation is performed by the same procedure as that used to calculate the second cost C2 at the above-described S53. Note, however, that in equations (2) and (3) for calculating the second cost C2, the vehicle speed Vt of the preceding vehicle is replaced by the set speed Vc of the vehicle, the set speed Vc of the vehicle is replaced by the vehicle speed Vb of the following vehicle, and the vehicle-to-preceding-vehicle distance D1 is replaced by the vehicle-to-following-vehicle distance D2 which is a distance to the following vehicle at timing at which the vehicle reaches the merge completion point. The vehicle-to-following-vehicle distance D2 for a case in which the vehicle travels in accordance with the modification candidate for the speed plan which is the processing target is calculated, and then deceleration Dec is calculated in accordance with the above-described equations (2) and (3) and is calculated as the third cost C3.

In addition, for a case in which Dec is larger than Dect, as with the second cost C2, the third cost C3 is infinity, i.e., the modification candidate for the speed plan which is the processing target is not adopted. In addition, for a case in which the vehicle-to-following-vehicle distance D2 is less than a predetermined distance (e.g., less than 1 m), too, likewise, the third cost C3 is infinity, i.e., the modification candidate for the speed plan which is the processing target is not adopted. Note that if there is no big difference in other conditions, then basically, the third cost C3 increases as the vehicle-to-following-vehicle distance D2 decreases, and risk occurring between the vehicle and the following vehicle after a merge is high, indicating an increase in a burden on the occupant. Furthermore, the third cost C3 increases as the speed of the vehicle that performs a merge decreases and the speed of the following vehicle increases, indicating that an influence exerted on the following vehicle after a merge is large.

Thereafter, at S55, the CPU 51 adds up the first cost C1 calculated at the above-described S52, the second cost C2 calculated at the above-described S53, and the third cost C3 calculated at the above-described S54, thereby calculating the total cost (hereinafter, referred to as merge cost C) for the modification candidate for the speed plan which is the processing target. Note that the merge cost C is calculated using the following equation (4):

$$C = K1 \times C1 + K2 \times C2 + K3 \times C3 \qquad (4)$$

Note that K1, K2, and K3 are coefficients, and numerical values thereof can be changed as appropriate based on what to prioritize upon modifying the speed plan. For example, when the time required for the vehicle to complete a merge is prioritized, K1 is set to a large value compared to K2 and K3, and when the risk between the vehicle and another vehicle is prioritized, K2 or K3 is set to a large value compared to K1.

Then, at S56, after calculating the merge cost C, targeting all modification candidates for the speed plan created at the above-described S51, the CPU 51 selects a modification candidate for the speed plan with the smallest value of the merge cost C, and overwrites the current speed plan. As a result, it becomes possible to minimize the influence on main lane's another vehicle traveling in the main lane which is exerted by the vehicle merging into the main lane from the acceleration lane, without unnecessarily increasing a burden on the vehicle's occupant. Note that since the speed plan modification process (S10) is periodically and repeatedly performed during travel of the vehicle, when there has been a change in the speed of main lane's another vehicle after modifying a speed plan, the speed plan modified once is further modified.

A process of selecting a modification candidate for the speed plan at the above-described S56 will be described below using a specific example.

Figure 20:
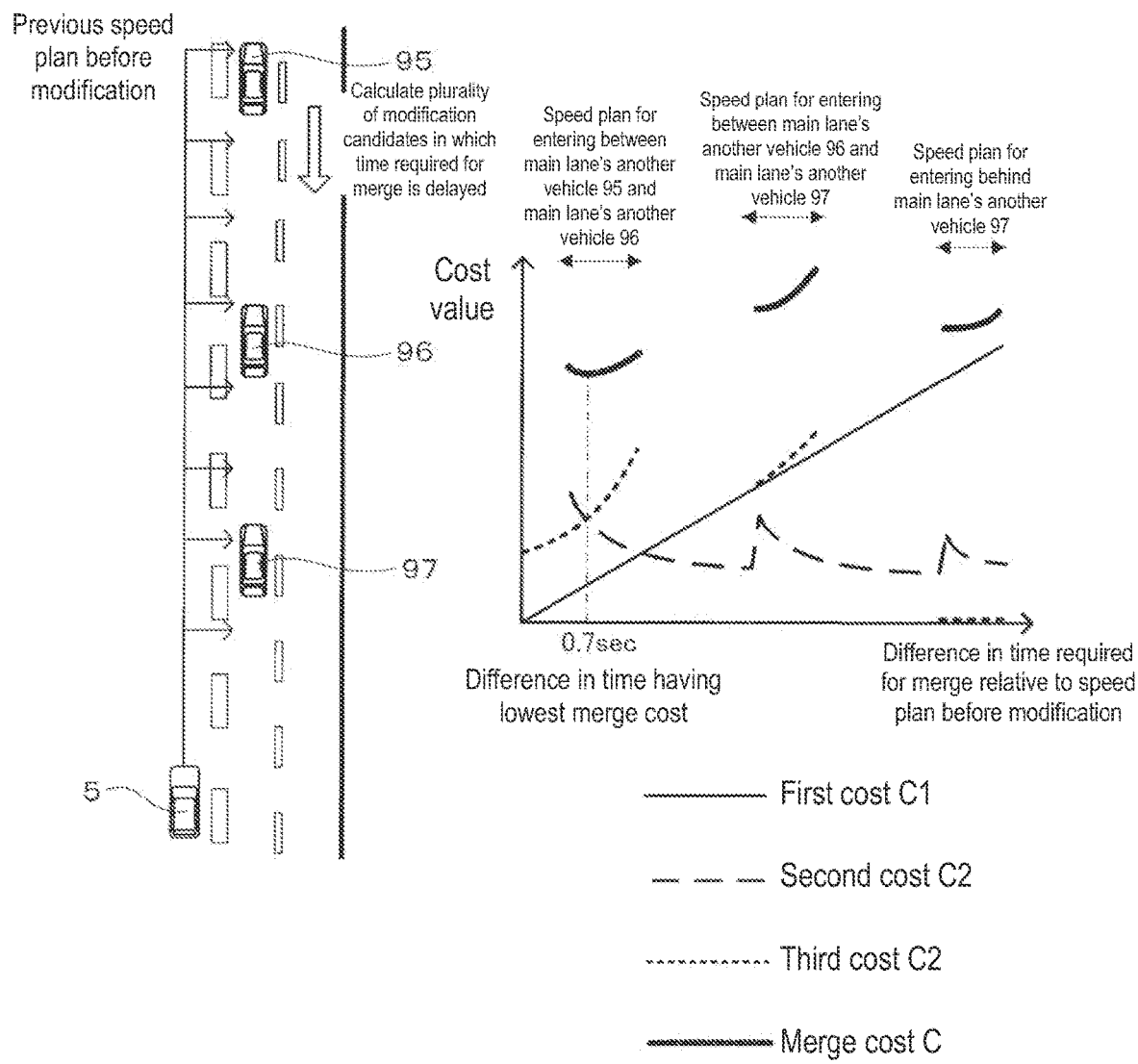
FIG. 20 is a diagram showing an example of costs calculated for modification candidates for a speed plan.

For example, an example shown in FIG. 20 is a case in which three main lane's other vehicles 95 to 97 travel in a main lane into which the vehicle 5 is to merge. In the example shown in FIG. 20, when the vehicle 5 travels along the static travel path generated at the above-described S3 based on the speed plan created at the above-described S4, a time difference T between the completion of a merge into the main lane by the vehicle 5 and the reaching of the leading main lane's another vehicle 95 at a merge completion point is less than the predetermined time, and thus, modification candidates for the speed plan are created. As described previously, the modification candidates for the speed plan are obtained by delaying the timing of reaching the merge completion point by the predetermined time (0.1 sec) from the current speed plan, and a graph on the right in FIG. 20 shows a first cost C1, a second cost C2, a third cost C3, and a merge cost C which are calculated for each modification candidate for the speed plan. Note that the example shown in FIG. 20 is a calculation example for a case in which K1=1.3, K2=0.8, K3=0.9, Dect=0.6 G, and Tn=0.5 sec and the driving distance between the main lane's other vehicles 95 to 97 is 3 sec. For a modification candidate for the speed plan in which the vehicle-to-preceding-vehicle distance D1 or the vehicle-to-following-vehicle distance D2 is within a predetermined distance (e.g., 1 m) (a section whose merge cost C is not shown in the graph of FIG. 20), the merge cost C is infinity. Thus, in the example shown in FIG. 20, modification candidates for the speed plan whose merge costs C are calculated are largely divided into three modification candidates: a modification candidate for the speed plan in which the vehicle 5 merges between the main lane's another vehicle 95 and the main lane's another vehicle 96, a modification candidate for the speed plan in which the vehicle 5 merges between the main lane's another vehicle 96 and the main lane's another vehicle 97, and a modification candidate for the speed plan in which the vehicle 5 merges behind the main lane's another vehicle 97. Particularly, the modification candidate for the speed plan in which the vehicle 5 merges between the main lane's another vehicle 95 and the main lane's another vehicle 96 and the timing of reaching the merge completion point is delayed by 0.7 sec from the current speed plan has the lowest merge cost C. As a result, in the example shown in FIG. 20, the speed plan is modified to a speed plan in which the timing of reaching the merge completion point is delayed by 0.7 sec from the current speed plan.

As described above in detail, the navigation device 1 and a computer program executed by the navigation device 1 according to the present embodiment obtain a planned travel route on which a vehicle travels (S1); calculate, when the planned travel route has a merge point where a merge into a main lane from an acceleration lane is performed, each of a first distance (L−Lc) required for vehicle speed to change to a set speed for merging into the main lane by the vehicle traveling in the acceleration lane, and a second distance (Lc) required to start and complete lane-to-lane movement from the acceleration lane to the main lane after the vehicle speed of the vehicle reaches the set speed, using high-precision map information 16 including information about the length of the acceleration lane, the lane width of the acceleration lane, and the lane width of the main lane (S35 and S36); further identify, as a merge start point, the location of a front portion of the first distance with a start point of the acceleration lane being a starting point, and identify, as a merge completion point, the location of a front portion of the second distance from the merge start point: create a speed plan for an area from the start point of the acceleration lane to a point where the merge completion point is reached (S37); and provide driving assistance for the vehicle, based on the created speed plan (S11 and S12). Thus, when the vehicle travels at a merge point where a merge into a main lane from an acceleration lane is performed, it becomes possible to create a detailed speed plan for performing a smooth merge at the merge point, based on road configurations and markings around the merge point. As a result, it becomes possible to provide appropriate driving assistance, using the created speed plan.

Furthermore, a travel path recommended for the vehicle to travel along from the start point of the acceleration lane until reaching the merge completion point is generated (S37) and driving assistance for the vehicle is provided based on the generated travel path (S11 and S12). Thus, when the vehicle travels at a merge point where a merge into a main lane from an acceleration lane is performed, it becomes possible to generate a detailed travel path for performing a smooth merge at the merge point, based on road configurations and markings around the merge point. As a result, it becomes possible to provide appropriate driving assistance, using the generated travel path.

In addition, it is determined whether travel of another vehicle is affected by the vehicle merging into the main lane from the acceleration lane when the vehicle travels along the generated travel path based on the created speed plan (S9): when it is determined that the travel of another vehicle is affected, a plurality of modification candidates for the speed plan are created (S51); and furthermore, costs are calculated for the plurality of modification candidates for the speed plan (S52 to S55): a recommended modification candidate for the speed plan is selected from among the plurality of modification candidates for the speed plan by comparing the calculated costs; and the speed plan is modified in accordance with the selected modification candidate for the speed plan (S56). Thus, when the vehicle travels at a merge point where a merge into a main lane from an acceleration lane is performed, even if another vehicle travels in the main lane into which the vehicle is to merge, by modifying a speed plan, it becomes possible to minimize the influence on another vehicle traveling in the main lane which is exerted by the vehicle merging into the main lane from the acceleration lane, without unnecessarily increasing a burden on a vehicle's occupant.

In addition, if it is determined that travel of another vehicle is affected by the vehicle merging into the main lane from the acceleration lane when the vehicle travels along the generated travel path based on the created speed plan, then a plurality of modification candidates for the speed plan with different set speeds are created. Thus, it becomes possible to create a plurality of modification candidates for the speed plan in which the timing of merging into the main lane is changed, without making a big change to the speed plan itself. Then, it becomes possible to select a more appropriate modification candidate for the speed plan from among the plurality of modification candidates for the speed plan.

In addition, if it is determined that travel of another vehicle is affected by the vehicle merging into the main lane from the acceleration lane when the vehicle travels along the generated travel path based on the created speed plan, particularly, if the main lane is congested, then the travel speed of another vehicle traveling in the main lane is obtained as a set speed, and a plurality of modification candidates for the speed plan are created in which the vehicle traveling in the acceleration lane decelerates to the set speed and which have different timings of starting deceleration. Thus, it becomes possible to create a plurality of modification candidates for the speed plan for decelerating to an appropriate set speed for merging into the congested main lane, by changing the timing of merging into the main lane. Then, it becomes possible to select a more appropriate modification candidate for the speed plan from among the plurality of modification candidates for the speed plan.

In addition, when costs are calculated for the plurality of modification candidates for the speed plan, at least one or more of a first cost based on time required to complete a merge into the main lane from the acceleration lane, a second cost based on a distance to a preceding vehicle present upon merging into the main lane, and a third cost based on a distance to a following vehicle present upon merging into the main lane and an influence exerted on travel of the following vehicle thereafter is calculated (S52 to S54). Thus, it becomes possible to calculate the costs taking into account the time required to complete a merge and risk occurring between the vehicle and another vehicle. As a result, even if another vehicle travels in the main lane into which the vehicle is to merge, by modifying a speed plan, it becomes possible to minimize the influence on another vehicle traveling in the main lane which is exerted by the vehicle merging into the main lane from the acceleration lane, without unnecessarily increasing a burden on the vehicle's occupant.

Note that the present disclosure is not limited to the above-described embodiment, and it is, of course, possible to make various modifications and alterations thereto without departing from the spirit and scope of the present disclosure.

For example, in the present embodiment, when a speed plan is created for a static travel path, as shown in FIG. 16, the acceleration is adjusted such that the set speed is reached at the timing of reaching the merge start point, but if the acceleration is within an allowable range (e.g., 0.2 G or less), then the acceleration may be adjusted such that the set speed is reached at timing before reaching the merge start point. In that case, a speed plan is created in which after reaching the set speed, the vehicle travels at a constant speed until reaching the merge start point.

In addition, likewise, in the present embodiment, when a speed plan is created for a static travel path, the vehicle starts acceleration at the timing of passing through the start point of the acceleration lane (timing at which speed limitation is canceled), but if the acceleration is within an allowable range (e.g., 0.2 G or less), then a speed plan may be created in which the vehicle starts acceleration at timing after passing through the start point of the acceleration lane.

In addition, in the present embodiment, as shown in FIG. 16, the vehicle travels at a constant speed in an area from the merge start point to the merge completion point where merge operation is performed, but there may be created a speed plan in which the vehicle moves to the main lane from the acceleration lane while accelerating or decelerating after passing through the merge start point or a speed plan in which an acceleration or deceleration section is provided in a part of a section after passing through the merge start point. In that case, the set speed which is a speed of the vehicle used upon passing through the merge start point is lower or higher than a speed of the vehicle (merge speed) used upon moving to the main lane from the acceleration lane thereafter. Note that when a speed plan is created in which the vehicle moves to the main lane from the acceleration lane while accelerating or decelerating after passing through the merge start point, there is a need to generate a travel path at the above-described S35, taking into account the vehicle performing lane-to-lane movement while accelerating or decelerating.

In addition, in the present embodiment, when a speed plan is modified, a comparison is made between totals of a first cost based on time required to complete a merge into a main lane from an acceleration lane, a second cost based on a distance to a preceding vehicle present upon merging into the main lane, and a third cost based on a distance to a following vehicle present upon merging into the main lane and an influence exerted on travel of the following vehicle thereafter, for respective modification candidates for the speed plan (S55), but a comparison may be made using only one type of cost or may be made between totals of any two types of cost.

In addition, in the present embodiment, if it is determined that travel of another vehicle is affected by the vehicle merging into a main lane from an acceleration lane when the vehicle travels along a generated travel path based on a created speed plan (S9: YES), then the speed plan is modified, but the travel path may be modified instead of the speed plan. Specifically, the modification is made by the following procedure.

First, a plurality of modification candidates for the travel path are generated in which the locations of a merge start point and a merge completion point in the travel path are changed. Note that only either one of the locations of the merge start point and the merge completion point may be moved or both locations may be moved. Note also that the direction of the movement may be toward a point-of-departure side or may be toward a destination side. Note, however, that acceleration occurring in the vehicle does not exceed an upper limit value (e.g., 0.2 G). Note that it is premised that a set speed is not changed, but the set speed may be changed.

Then, costs are calculated for the generated plurality of modification candidates for the travel path. Note that for the calculation of costs, as with calculation of costs for a speed plan (S52 to S55), a total cost obtained by adding up a first cost C1, a second cost C2, and a third cost C3 may be calculated for each of the travel paths which are modification candidates, or costs may be calculated using different criteria than the calculation of costs for the speed plan.

Thereafter, a comparison is made between the calculated costs to select a modification candidate for the travel path with the lowest cost, and the travel path is modified in accordance with the selected modification candidate for the travel path. In addition, the speed plan is also modified when necessary along with the modification to the travel path.

In addition, in the present embodiment, a static travel path that is finally generated is information that identifies a specific path (a set of coordinates and lines) along which the vehicle travels, but such a level of information that does not identify a specific path but can identify roads and lanes where the vehicle is to travel may be generated.

In addition, in the present embodiment, a lane network is generated using high-precision map information 16 (S23), but a lane network that targets roads across the country may be stored in advance in a DB, and the lane network may be read from the DB as necessary.

In addition, in the present embodiment, high-precision map information included in the server device 4 includes both information about the lane configurations of roads (lane-by-lane road configurations, curvatures, lane widths, etc.) and information about markings (centerlines, lane lines, edge lines, guidelines, guide zones, etc.) painted on the roads, but may include only the information about markings or may include only the information about the lane configurations of roads. For example, even if only the information about markings is included, it is possible to estimate information corresponding to the information about the lane configurations of roads, based on the information about markings. Furthermore, based on the information about markings, it is also possible to estimate the type of lane for an expressway, and further estimate the start point and end point of a lane for an acceleration lane, a deceleration lane, or a climbing lane. In addition, even if only the information about the lane configurations of roads is included, it is possible to estimate information corresponding to the information about markings, based on the information about the lane configurations of roads. In addition, the "information about markings" may be information that identifies the types or layout of markings themselves that mark off lanes, or may be information that identifies whether a lane change can be made between adjacent lanes, or may be information that directly or indirectly identifies the configurations of lanes.

In addition, the present embodiment describes, particularly, an example of generation of a travel path and creation of a speed plan for a case in which the vehicle travels at a merge point on an expressway, but application of the present disclosure is not limited to a merge point on an expressway, and the present disclosure can be applied to any point where the vehicle accelerates and merges.

In addition, in the present embodiment, as means for reflecting a dynamic travel path in a static travel path, a part of the static travel path is replaced by the dynamic travel path (S7), but instead of replacement, the static travel path may be modified to approximate to the dynamic travel path.

In addition, the present embodiment describes that autonomous driving assistance for performing autonomous travel independently of user's driving operations refers to control, by the vehicle control ECU 40, of all of an accelerator operation, a brake operation, and a steering wheel operation which are operations related to the behavior of the vehicle among vehicle operations. However, the autonomous driving assistance may refer to control, by the vehicle control ECU 40, of at least one of an accelerator operation, a brake operation, and a steering wheel operation which are operations related to the behavior of the vehicle among vehicle operations. On the other hand, it is described that manual driving by user's driving operations refers to performing, by the user, of all of an accelerator operation, a brake operation, and a steering wheel operation which are operations related to the behavior of the vehicle among vehicle operations.

In addition, driving assistance of the present disclosure is not limited to autonomous driving assistance related to autonomous driving of the vehicle. For example, it is also possible to provide driving assistance by displaying the static travel path generated at the above-described S3 or the dynamic travel path generated at the above-described S6 on a navigation screen and providing guidance using voice, a screen, etc. (e.g., guidance on a lane change or guidance on recommended vehicle speeds based on a speed plan). In addition, user's driving operations may be assisted by displaying a static travel path or a dynamic travel path on a navigation screen.

In addition, in the present embodiment, a configuration is adopted in which the autonomous driving assistance program (FIG. 4) is executed by the navigation device 1, but a configuration may be adopted in which the autonomous driving assistance program is executed by an in-vehicle device other than the navigation device 1 or by the vehicle control ECU 40. In that case, a configuration is adopted in which the in-vehicle device or the vehicle control ECU 40 obtains a current location of the vehicle, map information, etc., from the navigation device 1 or the server device 4. Furthermore, the server device 4 may perform some or all of the steps of the autonomous driving assistance program (FIG. 4). In that case, the server device 4 corresponds to a driving assistance device of the present application.

In addition, the present embodiment can also be applied to mobile phones, smartphones, tablet terminals, personal computers, or the like (hereinafter, referred to as portable terminals or the like), in addition to navigation devices. In addition, the present embodiment can also be applied to a system including a server and a portable terminal or the like. In that case, a configuration may be adopted in which each step of the above-described autonomous driving assistance program (see FIG. 4) is performed by either one of the server and the portable terminal or the like. Note, however, that when the present embodiment is applied to a portable terminal or the like, a vehicle that can provide autonomous driving assistance and the portable terminal or the like need to be connected to each other such that they can communicate with each other (it does not matter whether they are connected by wire or wirelessly).

REFERENCE SIGNS LIST

1: Navigation device, 2: Driving assistance system, 3: Information delivery center, 4: Server device, 5: Vehicle, 16: High-precision map information, 33: Navigation ECU, 40: Vehicle control ECU, 51: CPU, 72: Acceleration lane, 73: Main lane, 74: Main lane's another vehicle, Main lane's other vehicles, 85: Lane node, and 86: Lane link

The invention claimed is:

1. A driving assistance device comprising:
a processor and a memory storing algorithms configured to:
obtain a planned travel route on which a vehicle travels;
calculate, when the planned travel route has a merge point where a merge into a main lane from an acceleration lane is performed, each of a first distance and a second distance, using map information including information about a length of the acceleration lane, a lane width of the acceleration lane, and a lane width of the main lane, the first distance being required for vehicle speed to change to a set speed for merging into the main lane by a vehicle traveling in the acceleration lane, and the second distance being required to start and complete lane-to-lane movement from the acceleration lane to the main lane after the vehicle speed of the vehicle reaches the set speed;
identify, as a merge start point, a location of a front portion of the first distance with a start point of the acceleration lane being a starting point, and identifying, as a merge completion point, a location of a front portion of the second distance from the merge start point;
create a speed plan for an area from the start point of the acceleration lane to a point where the merge completion point is reached; and
provide autonomous driving assistance control for the vehicle, based on the created speed plan.

2. The driving assistance device according to claim 1, comprising:

obtain information on another vehicle traveling in the main lane;

determine whether travel of the another vehicle is affected by the vehicle merging into the main lane from an acceleration lane when the vehicle travels based on the created speed plan;

create a plurality of modification candidates for the created speed plan when it is determined that travel of the another vehicle is affected;

calculate costs for the plurality of modification candidates for a speed plan;

select a recommended modification candidate for the created speed plan from among the plurality of modification candidates for the created speed plan by comparing the calculated costs; and modify the created speed plan, in accordance with the recommended modification candidate for the created speed plan.

3. The driving assistance device according to claim 2, wherein the modified speed plan includes a plurality of modification candidates for the speed plan with different set speeds.

4. The driving assistance device according to claim 2, wherein when the main lane is congested, a travel speed of another vehicle traveling in the main lane is obtained as the set speed, and the modified speed plan includes a plurality of modification candidates for the speed plan in which the vehicle traveling in the acceleration lane decelerates to the set speed and which have different timings of starting deceleration.

5. The driving assistance device according to claim 2, wherein the calculated costs for the plurality of modification candidates for the speed plan includes at least one or more of a first cost based on time required to complete the merge into the main lane from the acceleration lane; a second cost based on a distance to a preceding vehicle present upon merging into the main lane; and a third cost based on a distance to a following vehicle present upon merging into the main lane and an influence exerted on travel of the following vehicle after the merge.

6. A driving assistance device comprising:

a processor and a memory storing algorithms configured to:

obtain a planned travel route on which a vehicle travels;

calculate, when the planned travel route has a merge point where a merge into a main lane from an acceleration lane is performed, each of a first distance and a second distance, using map information including information about a length of the acceleration lane, a lane width of the acceleration lane, and a lane width of the main lane, the first distance being required for vehicle speed to change to a set speed for merging into the main lane by a vehicle traveling in the acceleration lane, and the second distance being required to start and complete lane-to-lane movement from the acceleration lane to the main lane after the vehicle speed of the vehicle reaches the set speed;

identify, as a merge start point, a location of a front portion of the first distance with a start point of the acceleration lane being a starting point, and identifying, as a merge completion point, a location of a front portion of the second distance from the merge start point;

generate a travel path recommended for the vehicle to travel along from the start point of the acceleration lane until reaching the merge completion point; and provide autonomous driving assistance control for the vehicle, based on the generated travel path.

7. The driving assistance device according to claim 6, comprising:

obtain information on another vehicle traveling in the main lane;

determine whether travel of the another vehicle is affected by the vehicle merging into the main lane from the acceleration lane when the vehicle travels based on the generated travel path;

generate a plurality of modification candidates for the generated travel path in which a location of at least one of the merge start point and the merge completion point in the travel path is changed, when it is determined that travel of the another vehicle is affected;

calculate costs for the plurality of modification candidates for a travel path;

select a recommended modification candidate for the generated travel path from among the plurality of modification candidates for the travel path by comparing the calculated costs; and modify the generated travel path, in accordance with the recommended modification candidate for a travel path.

* * * * *